(12) United States Patent
Bewley et al.

(10) Patent No.: US 8,083,013 B2
(45) Date of Patent: Dec. 27, 2011

(54) MULTIMODAL AGILE ROBOTS

(75) Inventors: Thomas R. Bewley, La Jolla, CA (US);
Christopher Schmidt-Wetekam, Solana Beach, CA (US); Joseph Moore, San Diego, CA (US); Jerimiah DiMatteo, Manhattan Beach, CA (US); Mark Ramirez, Oakland, CA (US); David Zhang, Hacienda Hts, CA (US); Sean Summers, Zurich (CH)

(73) Assignee: The Regents of the University of California, Oakland, CA (US)

( * ) Notice: Subject to any disclaimer, the term of this patent is extended or adjusted under 35 U.S.C. 154(b) by 689 days.

(21) Appl. No.: 12/001,059

(22) Filed: Dec. 6, 2007

(65) Prior Publication Data

US 2008/0230285 A1    Sep. 25, 2008

Related U.S. Application Data

(60) Provisional application No. 60/868,842, filed on Dec. 6, 2006.

(51) Int. Cl.
*B62D 57/028* (2006.01)
*B60S 9/205* (2006.01)
*A63H 11/06* (2006.01)

(52) U.S. Cl. .............. 180/8.3; 180/199; 446/312; 901/1
(58) Field of Classification Search ............ 901/1, 8, 901/14; 180/8.3, 199; 446/312
See application file for complete search history.

(56) References Cited

U.S. PATENT DOCUMENTS

| | | | | |
|---|---|---|---|---|
| 2,247,354 A * | 7/1941 | Berger | ............ | 446/437 |
| 3,648,408 A * | 3/1972 | Terzian et al. | ............ | 446/291 |
| 4,736,826 A * | 4/1988 | White et al. | ............ | 191/12.2 A |
| 5,279,170 A * | 1/1994 | Chen | ............ | 74/84 R |
| 5,618,219 A * | 4/1997 | Simone et al. | ............ | 446/456 |
| 5,741,169 A * | 4/1998 | Chen | ............ | 446/441 |
| 6,066,026 A * | 5/2000 | Bart et al. | ............ | 446/460 |
| 6,068,073 A * | 5/2000 | Roston et al. | ............ | 180/8.5 |
| 6,227,934 B1 * | 5/2001 | Isaksson et al. | ............ | 446/470 |
| 6,247,546 B1 * | 6/2001 | Spletzer et al. | ............ | 180/8.5 |
| 6,308,791 B1 * | 10/2001 | Spletzer et al. | ............ | 180/8.1 |
| 6,502,657 B2 * | 1/2003 | Kerrebrock et al. | ............ | 180/218 |

(Continued)

OTHER PUBLICATIONS

Schmidt-Wetekam, C., et al., "Design, Optimization, and Control of a New Class of Reconfigurable Hopping Rovers" pp. 5150-5155, submitted to the 46th IEEE Conference on Decision and Control, New Orleans, LA. ISBN 978-1-4244-1497-0. Published on Dec. 14, 2007.

Summers, S., et al., "MPDopt: A versatile toolbox for adjoint-based model predictive control of smooth and switched nonlinear dynamic systems," Decision and Control, 2007 46th IEEE Conference, Dec. 12-14, 2007, pp. 4785-4790. New Orleans, LA. (abstract only).

(Continued)

*Primary Examiner* — Joanne Silbermann
*Assistant Examiner* — Daniel Yeagley
(74) *Attorney, Agent, or Firm* — Perkins Coie LLP

(57) ABSTRACT

Examples and implementations of various robotic mechanisms, devices, components, systems and techniques are provided, including multimodal robotic devices and systems. For example, a multimodal robot can be configured to autonomously reconfigure between two or more primary modes of operation. Such robots may be used in a wide range of applications, including reconnaissance, exploration, search and rescue, military, sports, personal assistance, education, and entertainment and toys. Described examples of multimodal robots can be wheeled robots that use two or more drive wheels to perform various motions and operations.

37 Claims, 23 Drawing Sheets

U.S. PATENT DOCUMENTS

| | | | |
|---|---|---|---|
| 6,793,026 B1 * | 9/2004 | De Fazio | 180/8.3 |
| 6,939,197 B1 * | 9/2005 | Hoeting | 446/437 |
| 7,172,488 B2 * | 2/2007 | Moll et al. | 446/437 |
| 7,249,640 B2 * | 7/2007 | Horchler et al. | 180/8.6 |
| 7,263,955 B1 * | 9/2007 | Fischer | 123/46 R |
| 7,494,398 B2 * | 2/2009 | Laurienzo | 446/454 |
| 7,882,915 B1 * | 2/2011 | Wishart | 180/203 |
| 2004/0000439 A1 * | 1/2004 | Burt et al. | 180/7.1 |
| 2007/0150110 A1 * | 6/2007 | Delson | 700/245 |
| 2007/0259602 A1 * | 11/2007 | Dunham | 446/466 |
| 2008/0231222 A1 * | 9/2008 | Hashimoto et al. | 318/587 |

OTHER PUBLICATIONS

Szeto, D., "Dual pendula swing up and stabilization via smooth nonlinear trajectory planning and feedback control," 2007 Thesis of David Szeto, Department of Mechanical and Aerospace Engineering at the University of California, San Diego. (86 pages) (abstract only).

* cited by examiner

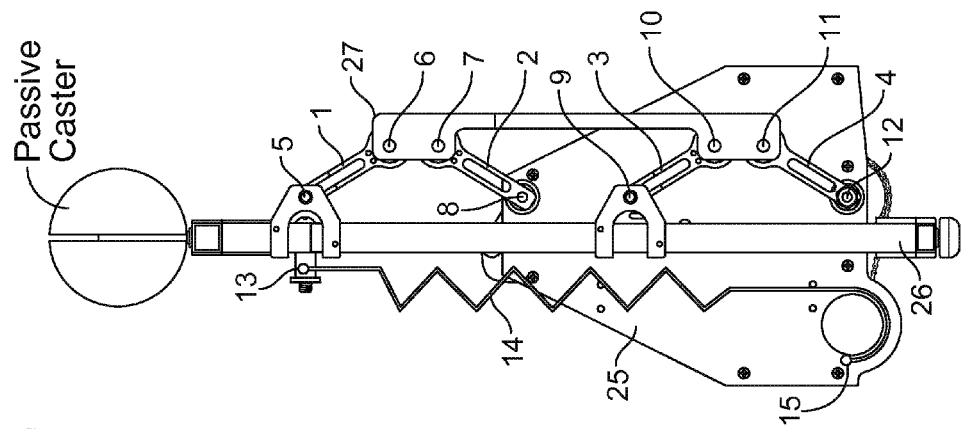
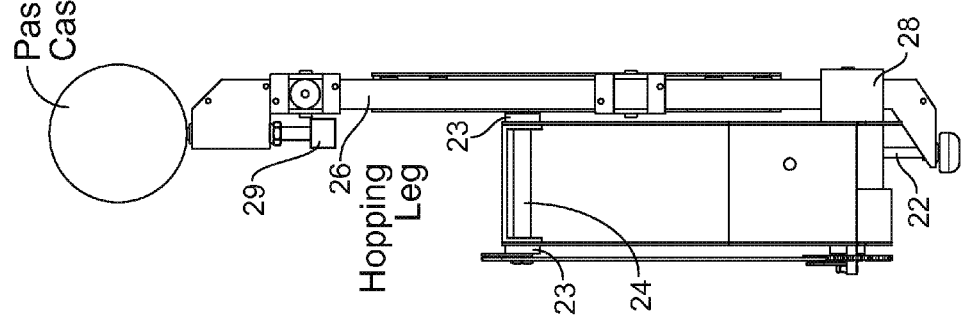
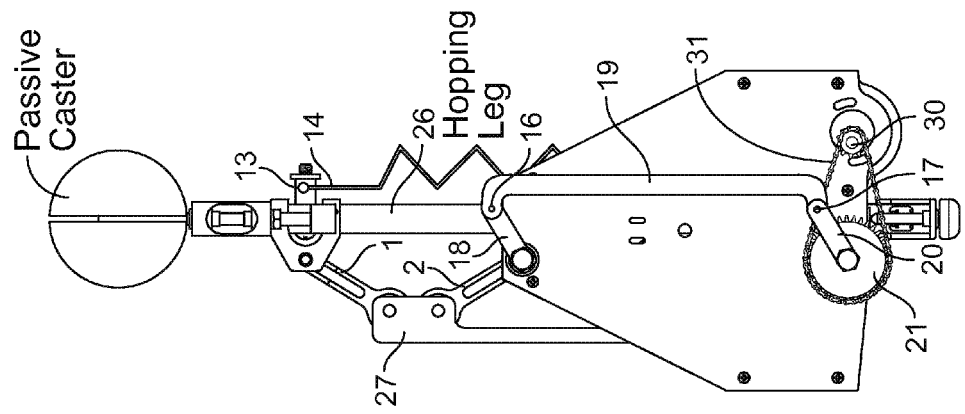
FIG. 5C
FIG. 5B
FIG. 5A

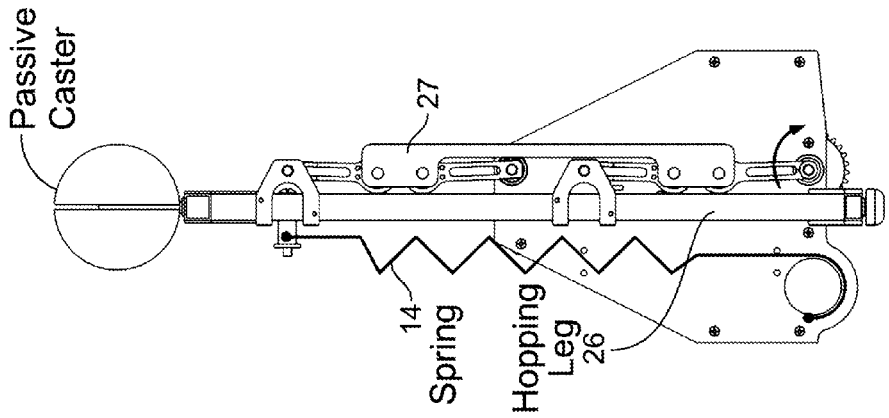
Locked State  FIG. 6A
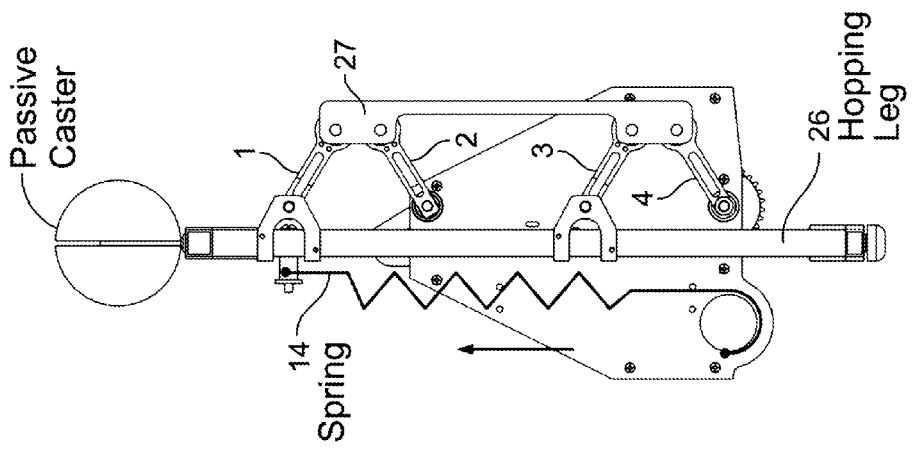
Deflected State  FIG. 6B
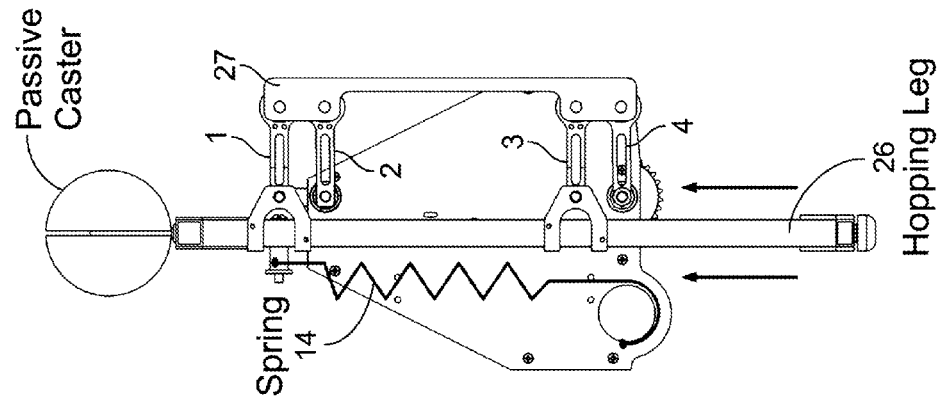
Upright State  FIG. 6C

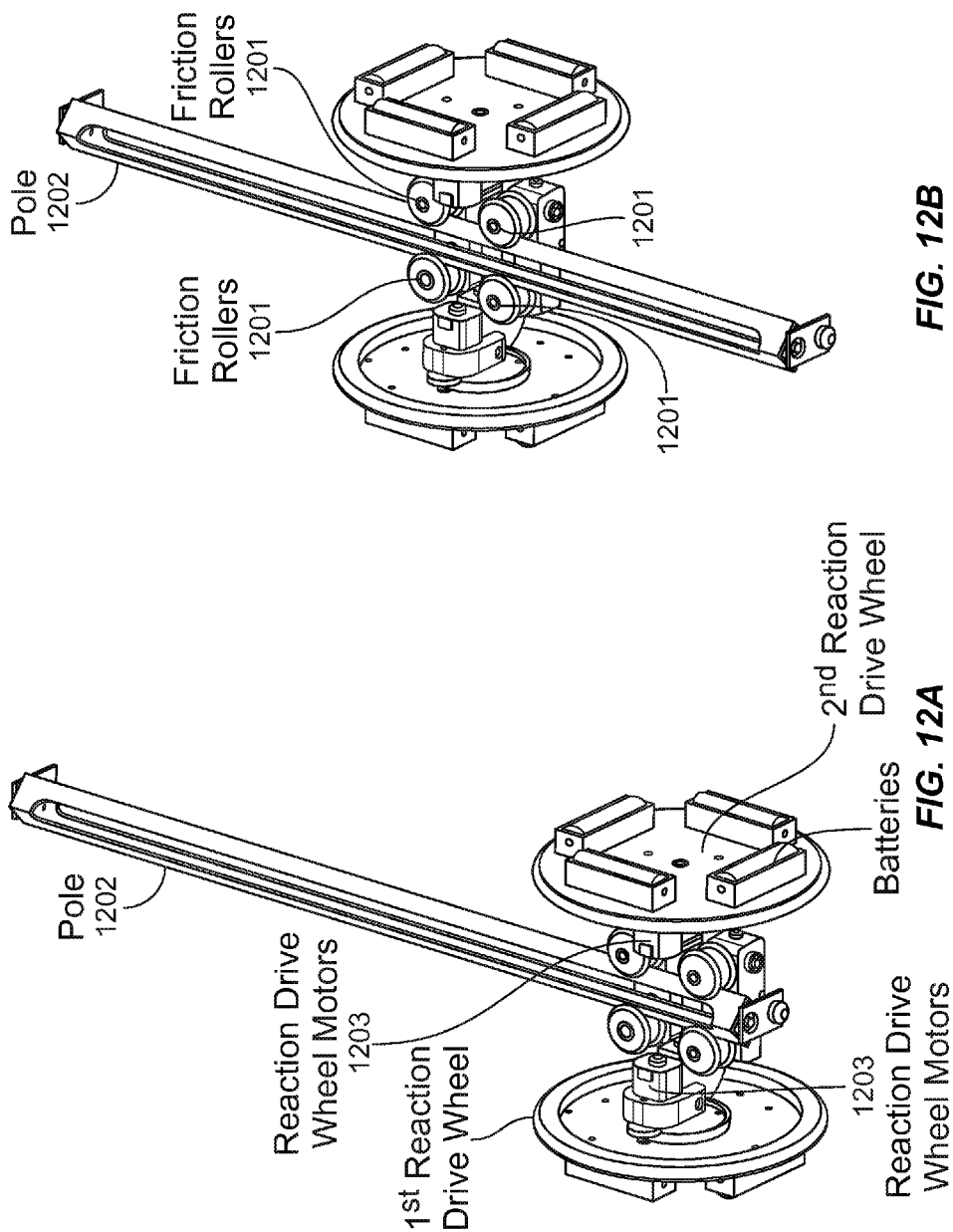

MULTIMODAL AGILE ROBOTS

PRIORITY CLAIM AND RELATED APPLICATION

This application claims the benefit of U.S. Provisional Application No. 60/868,842 entitled "Hopping and roving robot" and filed on Dec. 6, 2006, which is incorporated by reference as part of the specification of this application.

FEDERAL FUNDING

This invention was made with government support under LANL IUT 72232-001-03 and LANS subcontract 72232-002-06 awarded by Los Alamos National Laboratory. The government has certain rights in the invention.

TECHNICAL FIELD

This application relates to robotic devices and systems.

BACKGROUND

A robot is a machine that can perform certain operations or tasks in an autonomous manner. One or more digital processors such as a microprocessor may be implemented in a robot to control the operations of the robot.

Robots may be used to perform various tasks such as tasks that are dangerous, laborious, repetitive, or entertaining in a wide range of applications, including but not limited to, reconnaissance, search and rescue, military, exploration, personal assistance, education, entertainment and toys.

SUMMARY

This application describes examples and implementations of various robotic mechanisms, apparatus, systems and techniques including multimodal robotic devices and systems. Described exemplary multimodal robotic systems leverage efficient wheeled locomotion and can self-transform between different operational modes such as horizontal roving on two or more wheels and upright roving on two wheels, pole climbing and hopping.

These and other implementations and examples of robotic devices, systems and techniques are described in greater detail in the drawings, the detailed description and the claims.

BRIEF DESCRIPTION OF DRAWINGS

FIGS. 5A, 5B, 5C, 5D, 5E, 6A, 6B, 6C, 7A, 7B and 8 illustrate an example of a dual 4-bar linkage system to provide a variable transmission for a robotic hopping mechanism.

FIGS. 11A-1, 11A-2, 11A-3, 11A-4 and 11B illustrate operations of the robotic hopping mechanism based on the above dual 4-bar linkage system.

FIGS. 12A-12C illustrate an example of a motorized friction drive system facilitating pole climbing in a multimodal robot with two or more reaction drive wheels.

DETAILED DESCRIPTION

Figure 1:
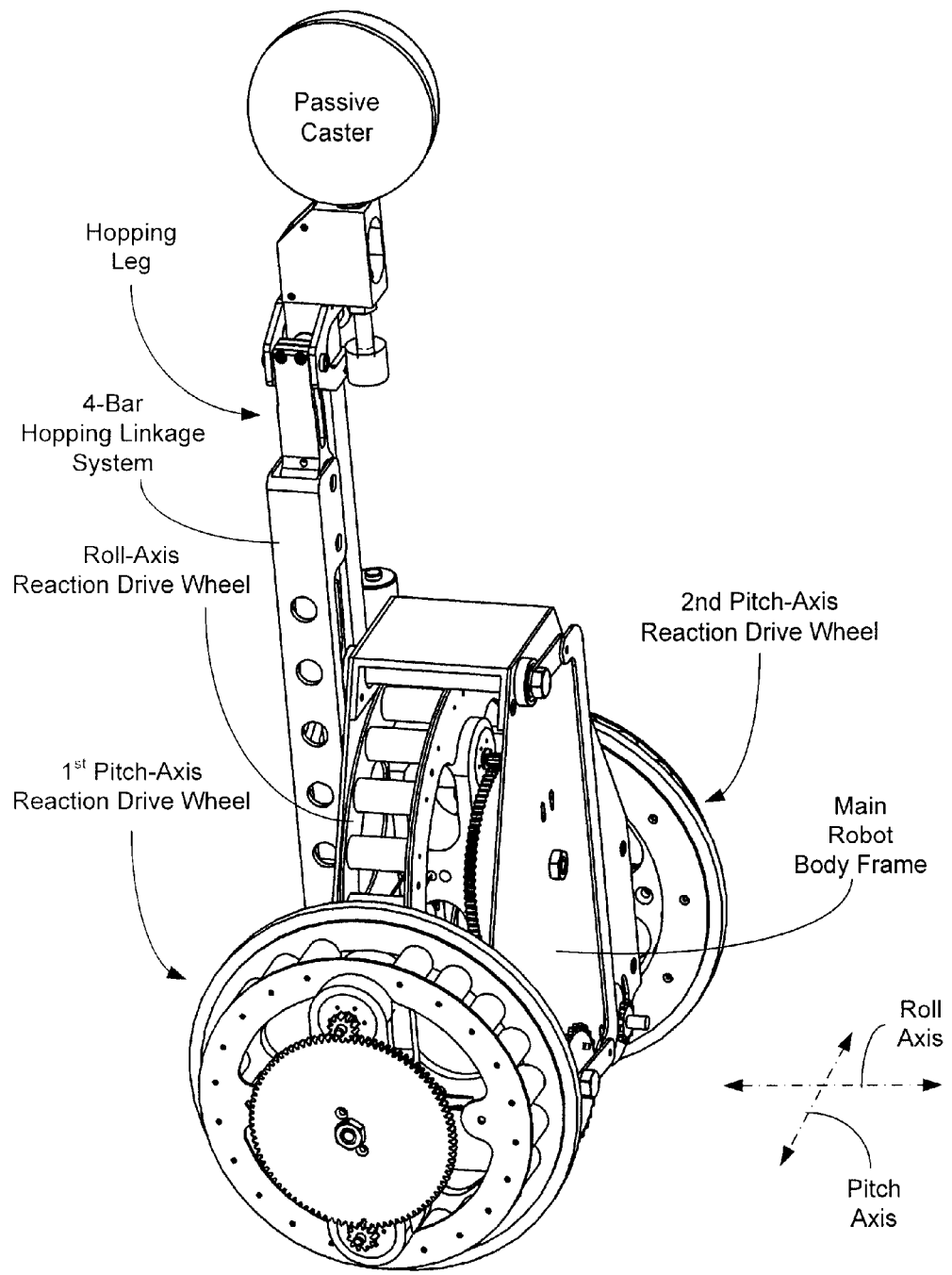
FIGS. 1, 2 and 3 illustrate an example of a hopping and roving robot having three reaction drive wheels.

The robotic mechanisms, apparatus, systems and techniques described in this application can be used in various robotic applications including constructions of multimodal robotic devices and systems. A multimodal robot includes structures that can autonomously reconfigure between two or more primary modes of operation. One or more digital processors such as a microprocessor may be implemented in such a multimodal robot to control its operations. For example, a robot described herein can include a body-mounted motion sensing module to detect the motion and orientation of the robot and the body-mounted motion sensing module can include one or more of the following: a magnetometer, a gyroscope, an accelerometer, and/or a GPS unit. In one implementation, for example, the sensing module may include three accelerometers for measurements along three orthogonal directions, and three gyroscopes for measurements along three orthogonal directions. Such robots may be used in a wide range of applications, including reconnaissance, exploration, search and rescue, military, sports, personal assistance, education, and entertainment and toys.

Examples of multimodal robots described in this application are wheeled robots that use two or more drive wheels to perform various motions and operations. The present wheeled multimodal robots can be configured to provide versatile operational modes that are difficult to achieve in other wheeled robot designs and to negotiate complex terrains such as terrains containing sharp and uneven protruding features of a size comparable to that of the robot itself. For example, this application describes exemplary designs and operations of multimodal robots that provide complex hopping and roving movements and a robot based on the described designs and operations can be used as a reconnaissance, search and rescue vehicle in harsh environments, involving complex terrain and obstacles inaccessible to conventional wheeled robots. The present wheeled multimodal robots can be designed to be efficient in energy consumption than various legged robots employing two or more multiple-degree-of-freedom robotic legs.

The present multimodal wheeled robots can incorporate one or more robotic mechanisms and control algorithms to facilitate their construction and effective operation. These robot systems are both efficient on smooth terrain and maneuverable on complex terrain. The robots described can autonomously change between their fundamental modes of operation. Thus, our new multimodal robot systems effectively bridge the gap between the efficiency of conventional rolling robots and the maneuverability of conventional legged robots. The specific examples and implementations below include the systems-level configurations used to achieve multimodal robot functionality, component-level mechanical designs used to realize multimodal robot systems, and control algorithms used to maneuver these multimodal robot systems and to stabilize their unstable operational modes even in the presence of significant disturbances and measurement errors.

This document describes exemplary designs and operations of multimodal robotic systems that leverage efficient wheeled locomotion and can self-transform between a plurality of the following operational modes: 1. horizontal roving: rolling on two or more wheels; 2. upright roving: rolling on two approximately equal-sized wheels situated approximately parallel to each other; 3. pole climbing: balancing while self-climbing a pole that may be extended vertically downward from the main body; and 4. hopping: self-propelling into the air, either once or repeating many times, by energetically extending a pole vertically downward from the main body to launch the body into the air in a pogo-stick-like fashion.

Figure 2:
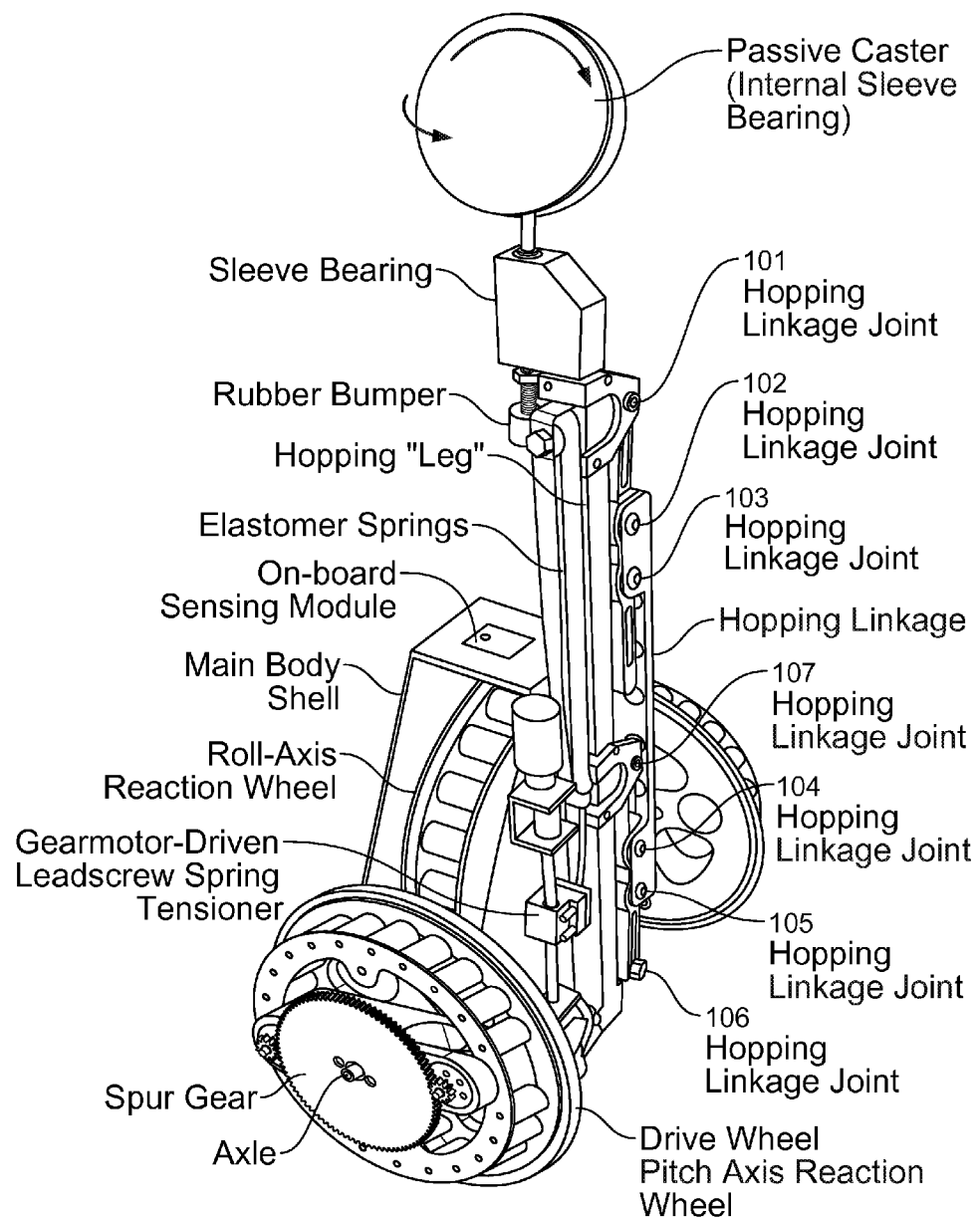
Figure 3:
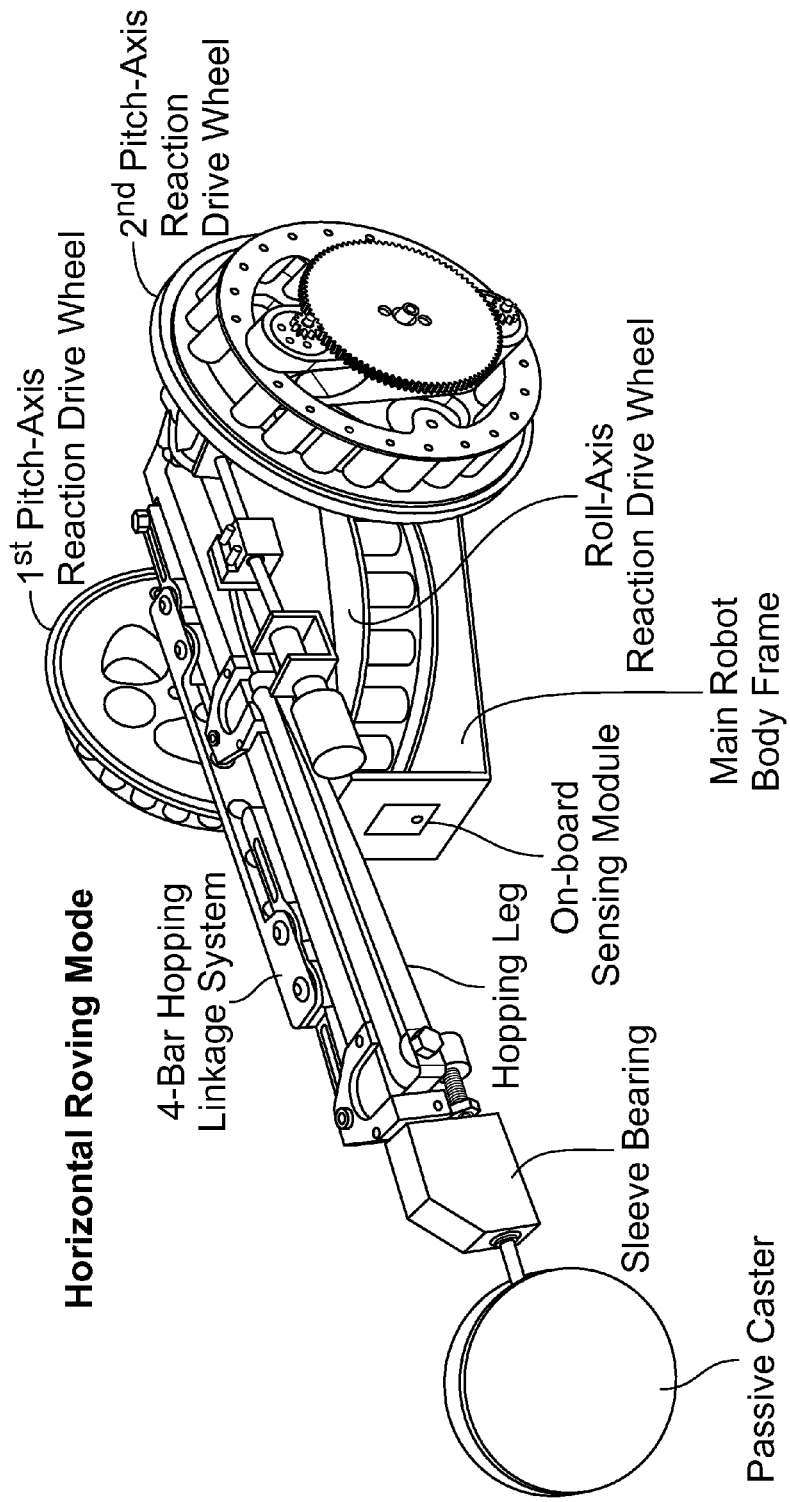
Figure 4A:
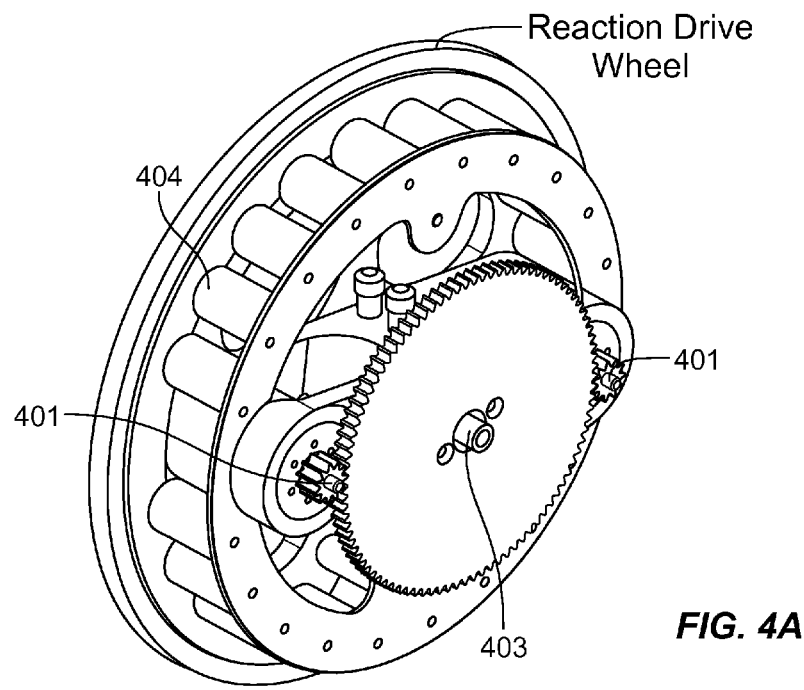
FIGS. 4A, 4B, 4C, 4D and 4E illustrate an example of a reaction drive wheel based on a functional mass design.
Figure 4B:
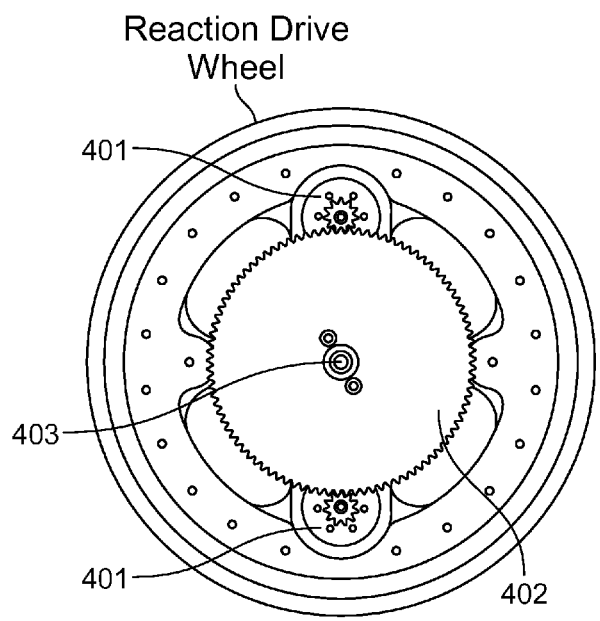
Figure 4C:
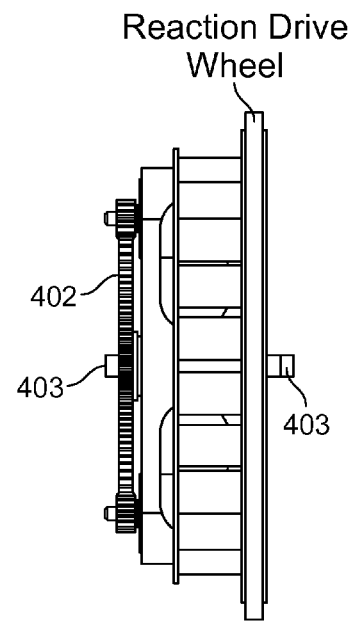
Figure 4D:
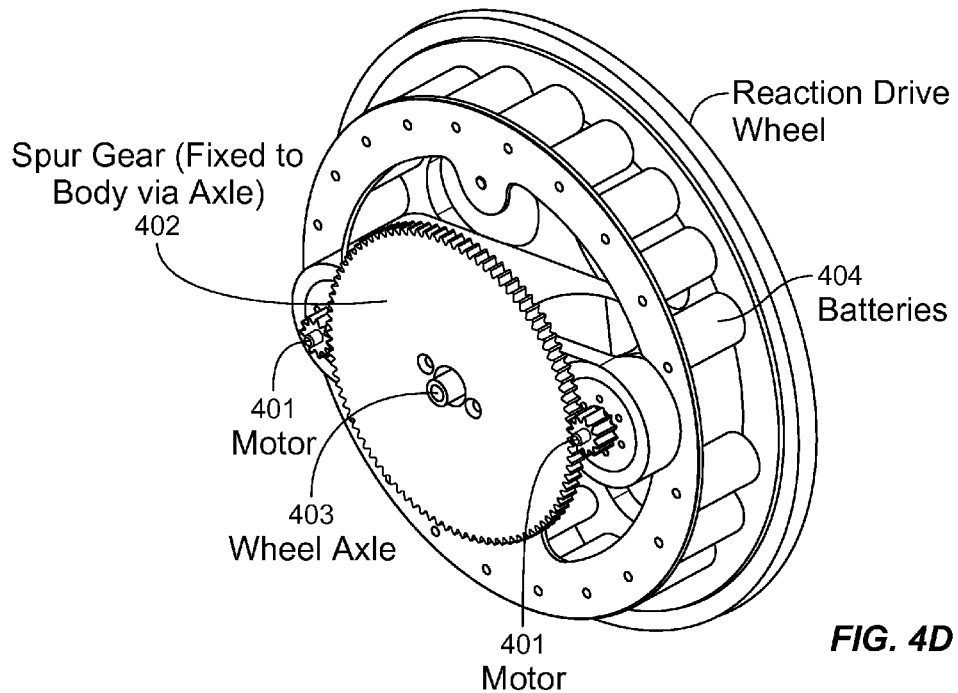
Figure 4E:
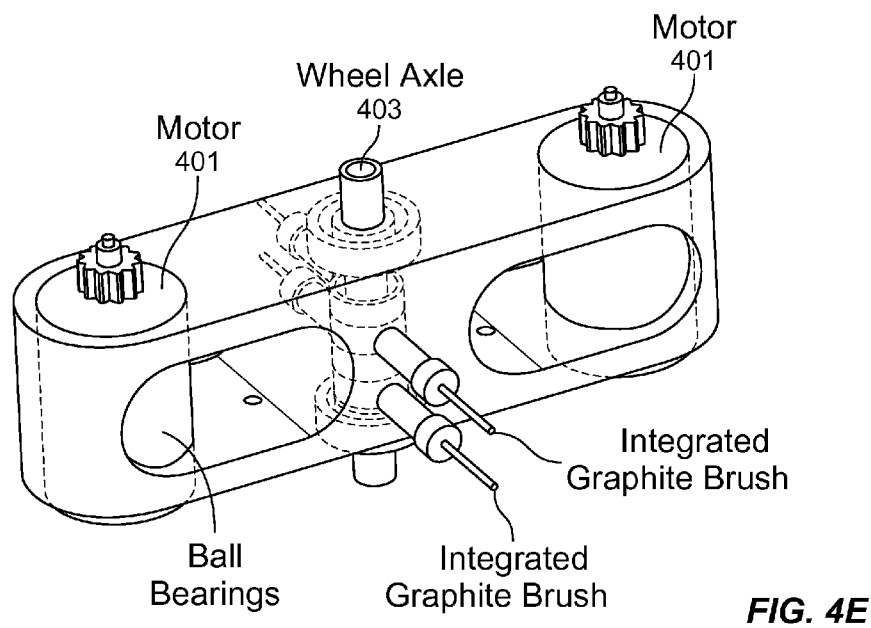

FIGS. 1, 2 and 3 illustrate an example of a hopping and roving multimodal robot having three reaction drive wheels. Referring to FIG. 1, this robot includes a main robot frame to which three reaction drive wheels are mounted for various rover motions and an elongated rigid beam movably engaged to the robot frame as a hopping leg to provide hopping motions. First and second pitch-axis reaction drive wheels are engaged to the robot frame on two opposite sides of the robot frame to spin around a first rotation axis referred to as the pitch axis. The first and second pitch-axis reaction drive wheels are positioned to stabilize the robot and to drive and move the robot. The first and second pitch-axis reaction drive wheels are independently powered, controlled and operated. The third reaction drive wheel is a roll-axis reaction wheel engaged to the robot frame to spin around a second rotation axis that is perpendicular to the first rotation axis. This roll-axis wheel is operable to balance the robot along with the two pitch-axis drive wheels. A spring-loaded hopping propulsion device is mounted to the hopping leg and the robot frame to linearly move the hopping leg relative to the robot frame for the hopping motion. In one implementation, a dual 4-bar hopping linkage systems can be used as part of this spring-loaded hopping propulsion device to use a hopping propulsion motor that causes a straight-line hopping motion of the hopping leg along its elongated direction relative to the robot frame. A passive caster can be positioned at the top end of the hopping leg to assist the motion of the robot when the top end touches a surface when the robot in a horizontal roving motion mode.

FIG. 2 shows a prototype robot based on the design in FIG. 1. Various components are illustrated and labeled and will be described in detail in later sections. Notably, FIG. 2 shows the robot in an upright roving mode. FIG. 3 further shows the robot in the horizontal roving motion mode by using the two pitch-axis reaction drive wheels to control the direction and speed of the motion.

This robot can be powered by two independently controlled drive wheels, which also function as reaction wheels for stabilization during hopping. This provides the capability of operating in three distinct modes: 1) Horizontal roving, 2) Upright roving, and 3) Hopping. In the horizontal roving configuration, the robot can be operated to drive on three wheels: the two pitch axis wheels and a passive caster affixed to the end of the hopping leg, and this operation of the three drive wheels gives the vehicle a low vertical profile, suitable for passing underneath low obstacles. In the upright mode, the robot drives solely on the two pitch-axis wheels, with the caster pointed skyward, providing a platform for mounting vision systems to survey the surroundings. Additionally, upon encountering an obstacle, the robot may hop over it, even from a running start, using a coupled dual 4-bar hopping propulsion mechanism.

In this example, the robot integrates roving and hopping abilities into a single streamlined package. Notably, this design incorporates three features: 1) The drive wheels used to propel the robot as a rover also serve as reaction wheels to balance the robot during hopping maneuvers. This adaptability reduces the mass and mechanical complexity of the robot. 2) All drive motors and batteries (except for the hopping propulsion drive motor) are mounted on the drive/reaction wheels, in order to maximize the stabilization provided by the reaction wheels for a given motor size. This configuration, in turn, can significantly reduce the overall weight of the robot by diminishing the need for large/powerful motors. 3) The hopping propulsion mechanism utilizes a spring-loaded coupled dual 4-bar linkage, which traces a perfectly straight line throughout its entire range of motion. This mechanism behaves as a continuously-variable transmission between the hopping propulsion motor and the leg of the robot, by converting input torque from a DC motor into low-speed/high-force output at the bottom of each rebound, and high-speed/low-torque output at the top of each rebound. In addition, the spring-loaded mechanism may be locked into a fully-tensioned state, using the same principle as a latch on a toolbox or ski-boot, allowing for offline build-up of hopping energy stored in the spring, which may be released "on-demand" without the need for clutches or locking pins.

The dual-four bar hopping linkage with a spring tensioner that is attached to a main body shell via linkage joints 101, 102, 103, 104, 105, 106 and 107 shown in FIG. 2. The hopping mechanism includes 7 links (including the main body shell and hopping "leg"), interconnected through 8 rotating ball-bearing joints, and is actuated via a direct connection to a high-speed gearmotor to hopping linkage joint 106. The linkage is attached to the hopping "leg" via joints 101 and 107. The motion of the hopping "leg" resulting from rotary actuation at joint 106, traces a perfectly straight line. This straight line motion can be difficult to achieve using other mechanisms, such as a conventional "double-wishbone" linkage used in automotive suspensions. In this particular design, this rotary actuation is preferred over the rack-and-pinion drive, due to the continuous variation of the relationship between torque input at joint 106 versus linear force output at the hopping "leg." In this configuration, the mechanism converts the motor torque into high-speed/low-force output at the top of each hopping stroke, and low-speed/high-force output at the bottom of each hopping stroke, thereby maximizing the operation of the high-speed hopping propulsion motor in its peak power band. Furthermore, the mechanism may be locked into a fully-tensioned state using the gearmotor which, to a certain extent, functions much like a latch on a ski-boot. This is in part because the effective gear reduction between the hopping propulsion motor to the hopping "leg" is infinite when the links in the four-bar mechanism are parallel.

In the horizontal roving mode as shown in FIG. 3, the two pitch-axis drive/reaction wheels propel and steer the robot, by independently varying the torque output at each wheel. A passive caster on the end of the hopping linkage trails behind the robot, allowing this end of the robot to slide freely along the ground, in response to both forward and steering motions of the drive wheels. In the upright roving mode as shown in FIG. 2, the robot balances on the two drive wheels, using attitude information supplied by on-board accelerometers and gyroscopes inside an on-board sensing module, in order to remain upright. The drive wheels act as necessary to maintain the balance of the robot in the presence of disturbance forces on the body. The robot may move forward and steer in this mode by appropriately leaning forward or backward to compensate for the inertial forces generated during these maneuvers. The transition between horizontal roving and upright roving is accomplished by "popping a wheelie"; i.e.

applying sufficient torque through the drive wheels, so as to raise the passive caster skyward. The robot may transition back from the upright mode to the horizontal mode in a similar manner.

In the hopping mode, the hopping mechanism is activated while the robot is in the upright mode, in order to launch the robot, using the combined energy of the high-speed hopping propulsion motor and the pre-tensioned elastomer springs. The robot may be re-oriented during takeoff, flight, and landing by appropriately accelerating the drive/reaction wheels, in order to produce an equal and opposite torque on the robot body. Attitude measurements provided by on-board accelerometers and gyroscopes shown in FIGS. 2 and 3 allow the robot to stabilize itself throughout the hopping cycle, as well as to hop forwards, backwards and side-to-side. The robot may transition from the hopping mode, back to the upright mode by sufficiently loosening the elastomer springs via the leadscrew mechanism, so that the robot "bottoms out" on its wheels during landing.

FIGS. 4A, 4B, 4C, 4D and 4E illustrate an example of a reaction drive wheel based on a functional mass design. For example, each reaction drive wheel is configured to include at least one drive motor and a portable power supply that energizes the drive motor to power the wheel. The portable power supply can include at least one battery. Reaction wheels in FIGS. 4A, 4B, 4C, 4D and 4E are shown to have both batteries (404) and motors (401) mounted as the functional mass. In this embodiment, a fixed spur gear (402) is mounted to the robot body concentric to the wheel axis (403), to which the shaft of two motors (401) mounted on the wheel are engaged with smaller gears. In one implementation of the design in FIGS. 1, 2 and 3, each of the pitch-axis reaction drive wheels and the roll-axis reaction drive wheel is configured to include a drive motor and a portable power supply that energizes the drive motor to power the respective wheel, as well as other motors attached to the main body shell.

Multimodal robotic systems designed to transform only between horizontal and vertical roving operation modes have no particularly special constraints on the wheels used, and simple off-the-shelf (OTS) wheels may be used. However, multimodal robotic systems that may also be used in the climbing and/or hopping operational modes require the wheels to, at times, act as reaction wheels. As such, the wheels must have significant mass to be effective in this capacity. In the present designs, in order that the robot be as efficient and lightweight as possible, it is thus beneficial to include functional mass on the wheels. As batteries are one of the heaviest set of components in the robot design, it is beneficial to mount some or all of the batteries on the wheels. In addition, in some designs, the motors that turn the reaction wheels can be mounted on the wheels as well as shown in FIGS. 4A-4E.

In the base, stable configuration, a multimodal robotic system can move around on two or more drive wheels. As an example, a three-wheel system can include the two "main" wheels at or near one end of the body, and one or more smaller wheels at or near the opposite end. This is a stable configuration. The main wheels can be independently powered, so forward/backward motion may be achieved by torquing both wheels in the same direction, whereas turning may be achieved by torquing both wheels in the opposite direction, steering the vehicle much like one steers a military tank.

The multimodal robots proposed herein are also designed to have a large enough torque available to the main wheels, a small enough moment of inertia around the axis of the main wheels, and enough clearance around the end of the vehicle to "pop a wheelie" and upright the vehicle into a two-wheeled rover configuration akin to that of a Segway human transporter.

In some implementations, this fast torquing motion may be designed to be powerful enough that, if a projectile (spherical, cylindrical, or otherwise) is stored within body of the robot and released into a lacrosse-like hook (or impinges upon a paddle/racket) at the upper end of the vehicle at the appropriate time, then said projectile can be catapulted in a controlled fashion in any desired direction.

FIGS. 5A, 5B, 5C, 5D, 5E, 6A, 6B, 6C, 7A, 7B and 8 illustrate an example of a dual 4-bar linkage system to provide a variable transmission for a robotic hopping mechanism.

Figure 5D:
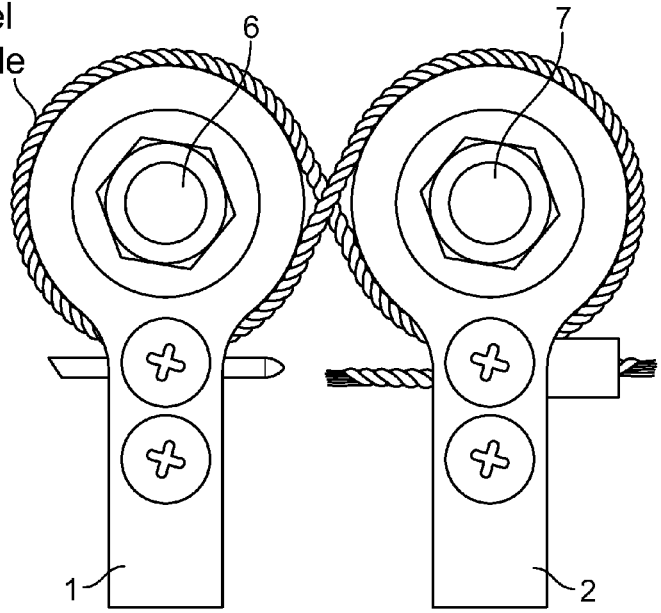
Figure 5E:
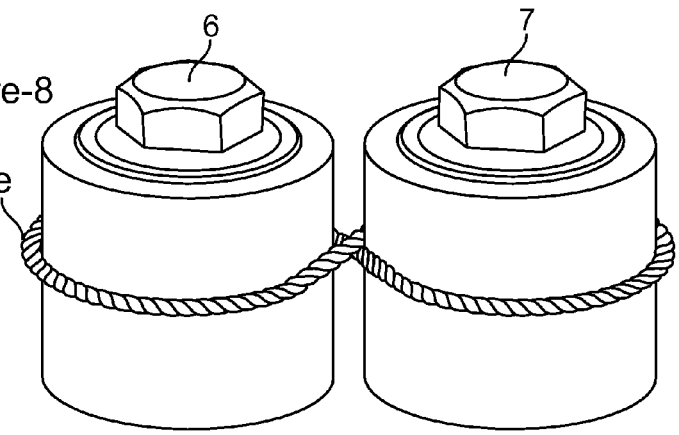

FIGS. 5A, 5B and 5C show three different views of the dual 4-bar linkage system and its components that facilitate the directed release of gradually accumulated tension. The hopping mechanism employs a "hopping leg" (26) that is joined to the main vehicle body (25) via a pair of coupled four-bar linkages, the first four-bar linkage consisting of members (1,27,3,26) and joints (5,6,9,10), and the second four bar linkage consisting of members (4,27,2,25) and joints (7,8,11, 12). Link 1 is constrained to counter-rotate symmetrically with respect to link 2 about the axis orthogonal to link 27, by means of a "figure-8" loop of flexible stranded steel cable wrapped around the round portion and rigidly embedded within the elongated portion of the links (this is also true for links 3 and 4). FIGS. 5D and 5E show an example of this "figure-8" loop design. The main load-bearing joints (8,12) are supported by ball bearings (23) with a hollow spacer (24) sandwiched between them and the main body (25).

The motion of the hopping leg resulting from rotary actuation at joint (12) traces a straight line. In this particular embodiment, this rotary actuation of the leg is preferred over a standard rack-and-pinion drive configuration due to the continuous variation of the ratio between torque input at joints (12,30) and linear force output at the hopping leg in the present design. In this configuration, the mechanism converts motor torque into high-speed/low-force actuation of the leg when links (1,2,3,4) are nearly orthogonal to link (27), and low-speed/high-force output when links (1,2,3,4) are nearly parallel to link (27), thereby maximizing the operation of the high-speed hopping propulsion motor in its peak power band during the hopping cycle.

The hopping mechanism is actuated via a battery-powered gear-motor (28) by means of a roller-chain drive (30,31,21), wherein sprocket (21) rotating about joint (12) is permanently engaged to link (4). A spring (14), connected to the leg at (13) stores and releases tension as necessary to facilitate hopping motion of the body.

As links (1,2,3,4) become nearly parallel with link (27), the motor torque input at joints (12,30) required to oppose the tension in spring (14) approaches zero, allowing the hopping linkage to lock into a tensioned state. Within the tensioned state, the spring may be gradually elongated via force applied by a modestly sized motor with a large gear reduction, so as to facilitate energetic hops, which might otherwise only be possible through the use of significantly more powerful actuators.

Referring to FIGS. 6A-6C, three operation states of the dual 4-bar hopping mechanism are illustrated: locked state when the four bars are parallel (FIG. 6A), the deflected state (FIG. 6B), and the fully upright state (FIG. 6C). When the motor is driven to rotate link (4) clockwise, the body moves linearly upward with respect to the leg (26) until it impacts a rubber bumper (29), resulting in liftoff of the vehicle [as illustrated in FIG. 6C]. Upon landing, the motor is reversed to increase the downward velocity of the body with respect to the leg until it stalls (due to the opposing torque generated by the spring tension), whereupon (if in continuous hopping mode) the motor is again reversed to propel the main body again skyward. Alternatively, the device can just as easily be returned to the locked state [as illustrated in FIG. 6A] after a single hop.

A third auxiliary four bar linkage consisting of members (18,19,20,25) and joints (8,16,17,12) is permanently attached to links (2,4) via joints (8,12). This auxiliary linkage serves only to constrain members (2) and (4) to rotate in the same direction when links (1,2,3,4) are nearly parallel with link (27) [as illustrated in FIG. 6A]. A pin with a tapered tip (22) engages a hole in the bottom of the body (25), to add stability to the main linkage in a similar manner provided by the auxiliary linkage when links (1,2,3,4) are nearly parallel with link (27).

Figure 7A:
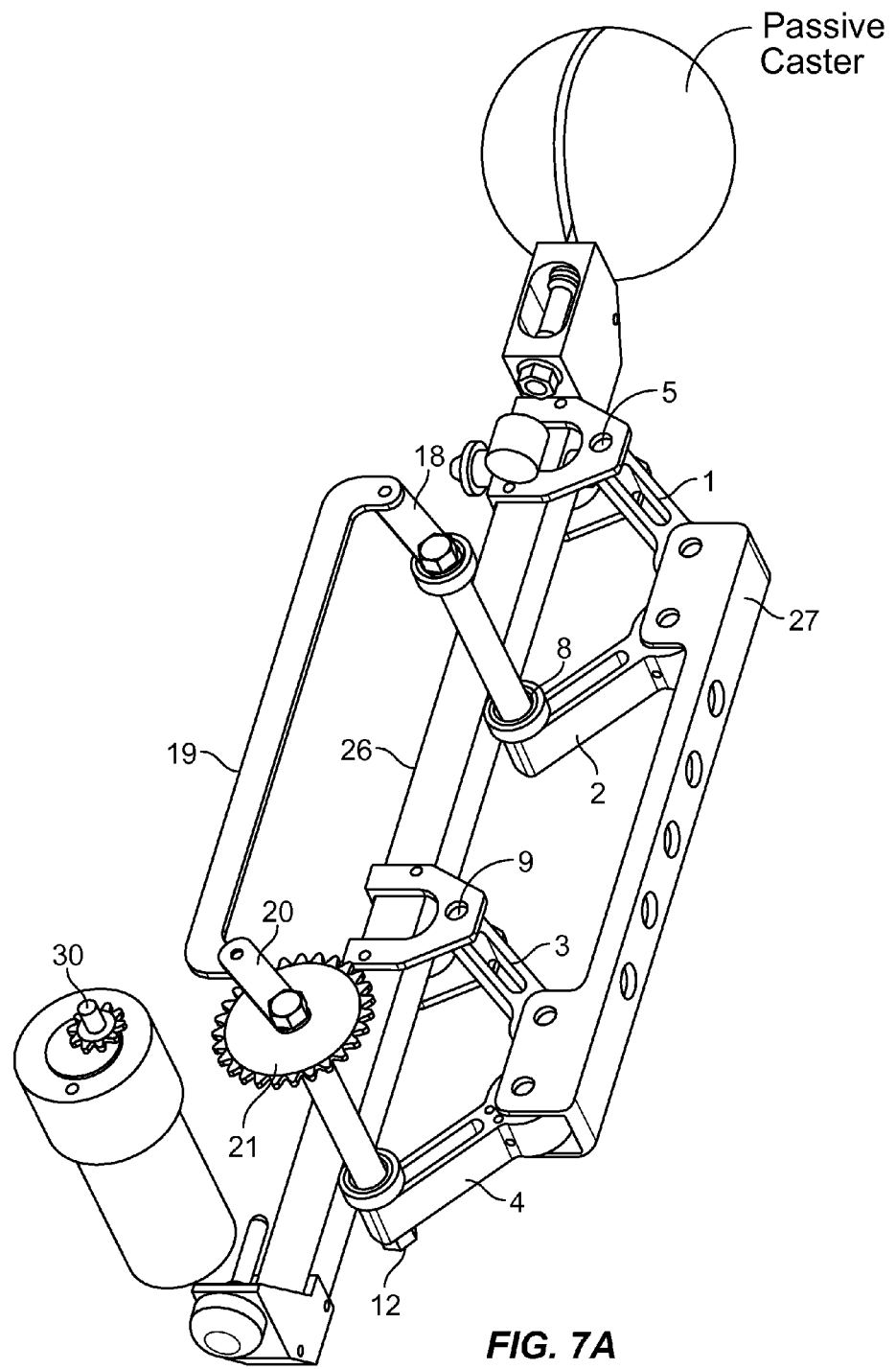
Figure 7B:
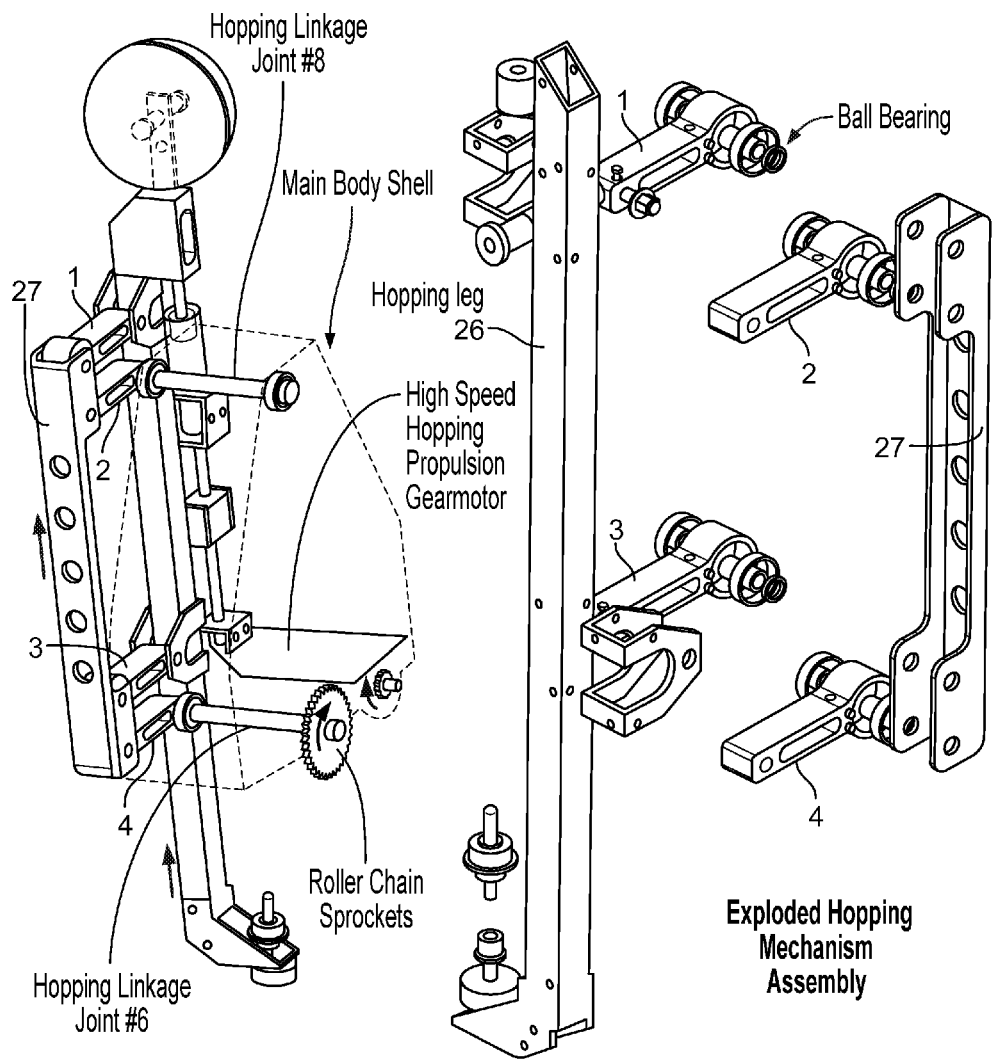
Figure 8:
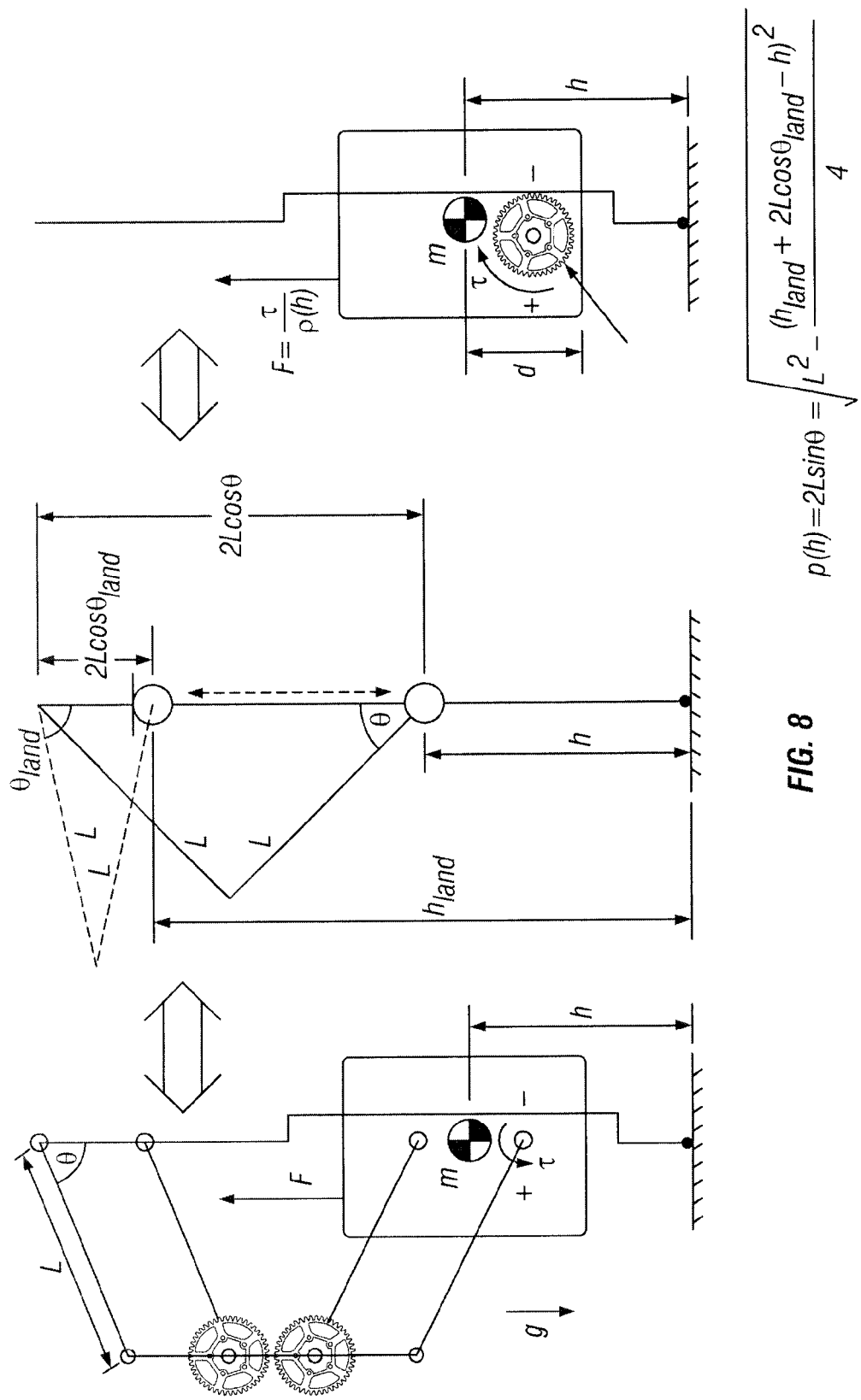

FIGS. 7A and 7B show additional details of the dual 4-bar hopping mechanism illustrated in FIGS. 5A-5C and 6A-6C. FIG. 8 illustrates kinematics of the dual 4-bar hopping mechanism, in terms of an analogous rack-and-pinion drive with a continuously variable pinion gear radius, $\rho(h)$ (far right). Note that the effective gear reduction, $1/\rho(h)$, is infinite when the links are parallel ($\theta=0$).

Figure 9A:
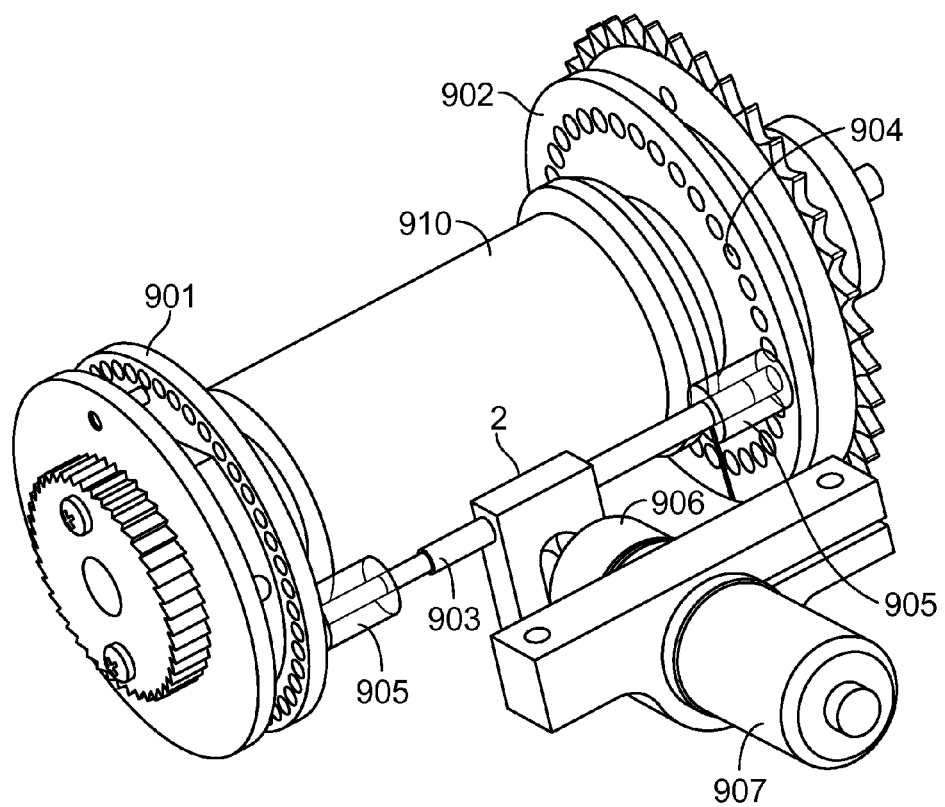
FIGS. 9A, 9B, 9C, 10A, and 10B illustrate an example of a hopping propulsion motor for driving the dual 4-bar linkage system.
Figure 9B:
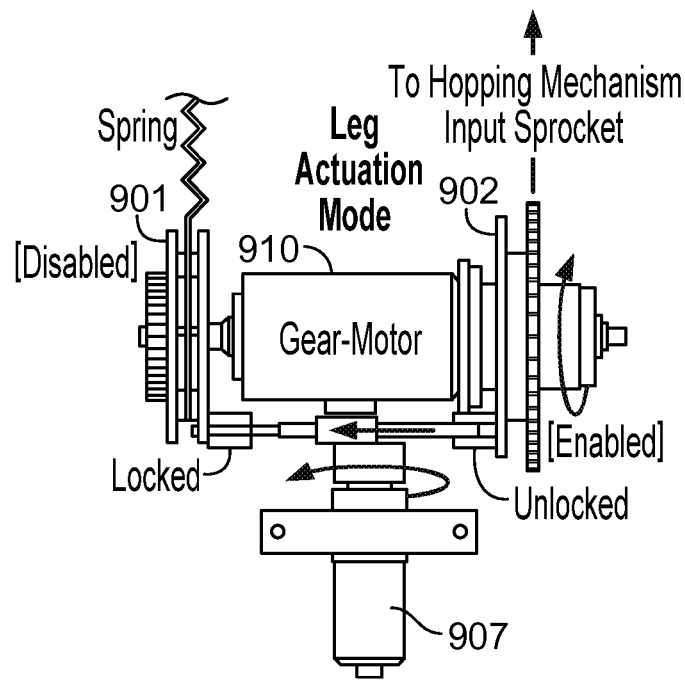
Figure 9C:
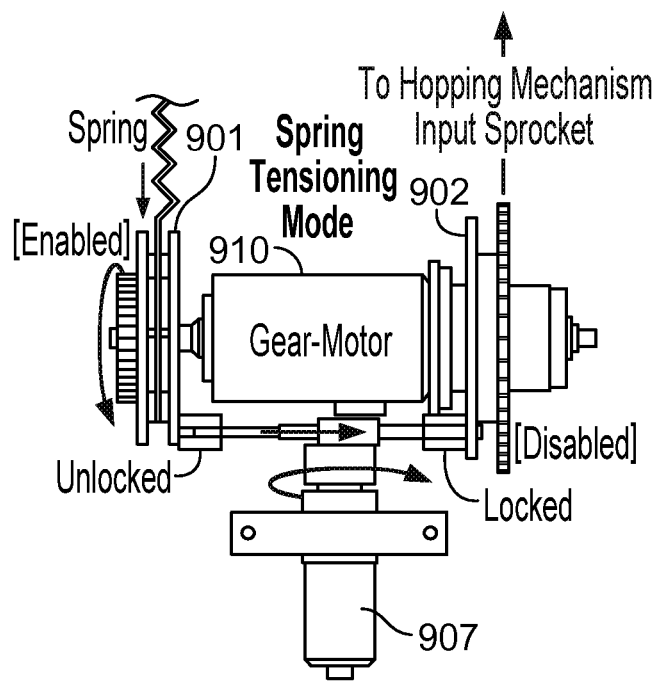

In one embodiment of the hopping mechanism, the propulsion motor (28) in FIGS. 5A-5C can be used as a dual-mode motor. FIGS. 9A, 9B and 9C show an example of this dual-mode motor. In this example, the motor is mounted via bushings in the main body (25) whereby the motor housing can be designed to freely rotate about its centerline, so as to apply torque to either (but not both) of its two ends. The "linkage-end" of the motor (i.e. the end of the motor to which sprocket 30 is attached) actuates the hopping linkage via the chain drive affixed to joint 12 in the previously described manner when the "spring-end" of the motor (i.e. the end of the motor around which the spring (14) winds and attaches at (15)) is held fixed. Conversely, the "spring-end" rotates so as to stretch/retract the spring when the "linkage-end" is held fixed. This method of actuation eliminates the need for separate linkage actuation and spring tensioning motors, thereby reducing overall vehicle weight.

Figure 10A:
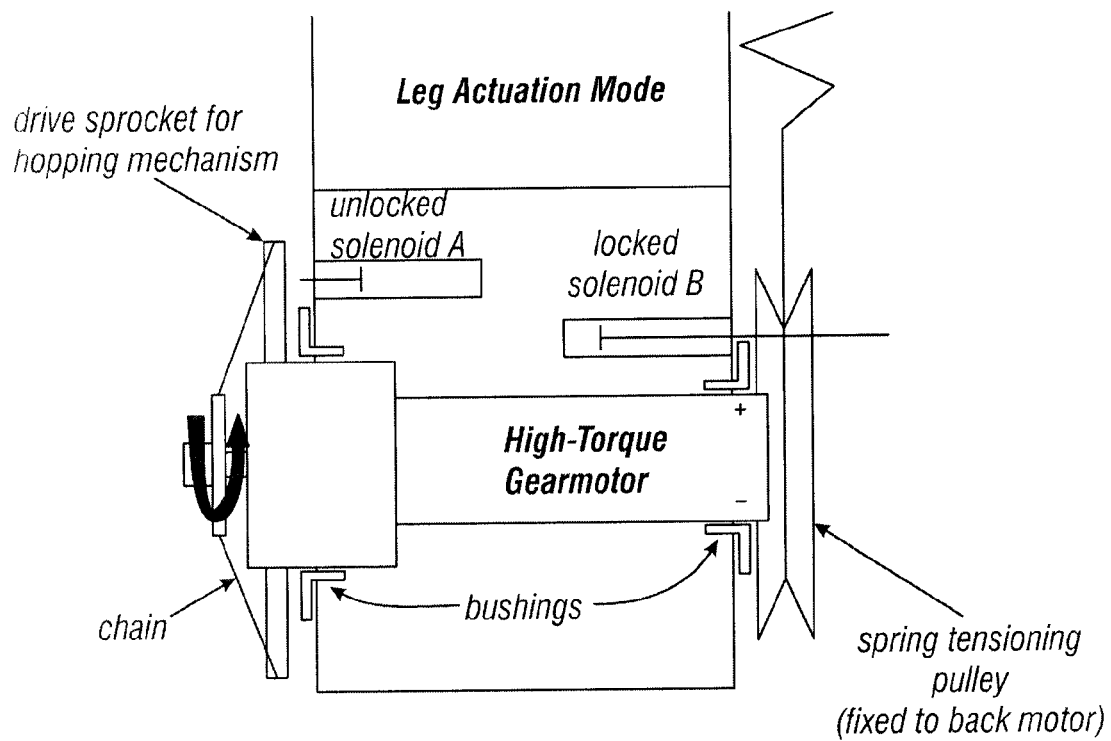
Figure 10B:
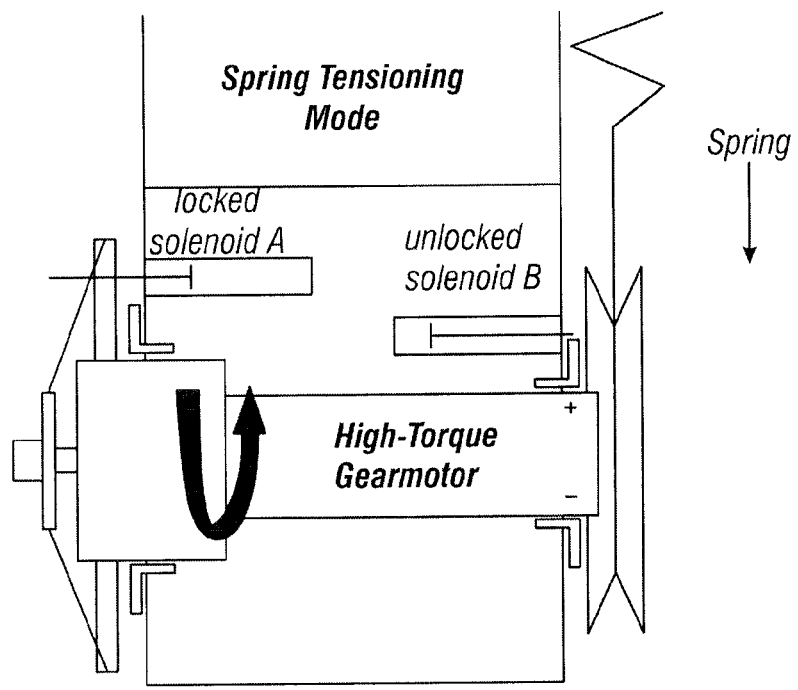

FIGS. 9A, 9B and 9C illustrate this dual-mode operation of the motor. Either of the spring-end (901) or linkage-end (902) of the motor (910) can be held fixed with respect to the body by means of a locking pin (903) that engages one of many holes (904) arranged in a circular array concentric to the motor housing. The locking pin (903) is guided by two bushings (905) and may be actuated by an eccentric pin (906) attached to the output shaft of a small gear-motor (907). FIGS. 10A and 10B further illustrate the operations of the two modes of the motor in FIGS. 9A, 9B and 9C.

Figures 2, 11A:
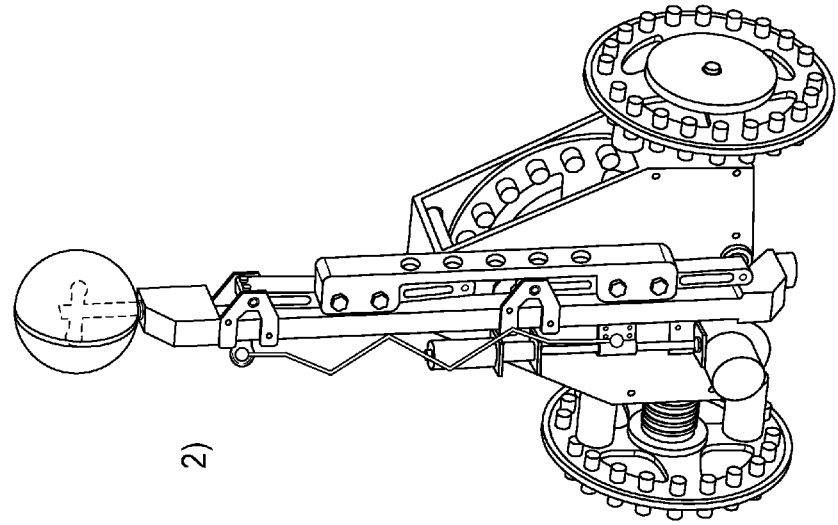
Figures 1, 11A:
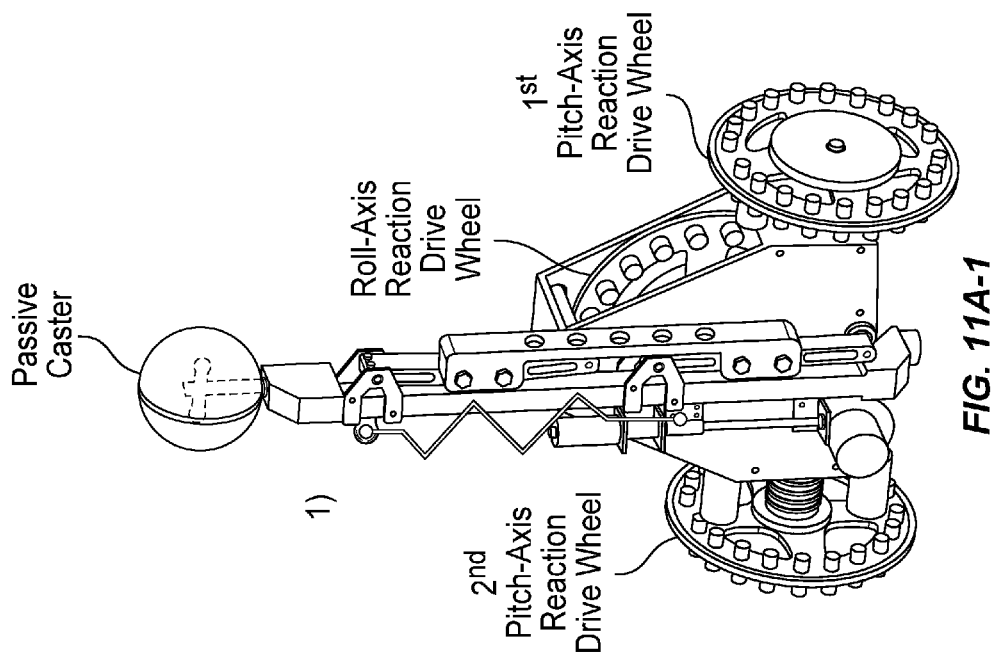
Figures 4, 11A:
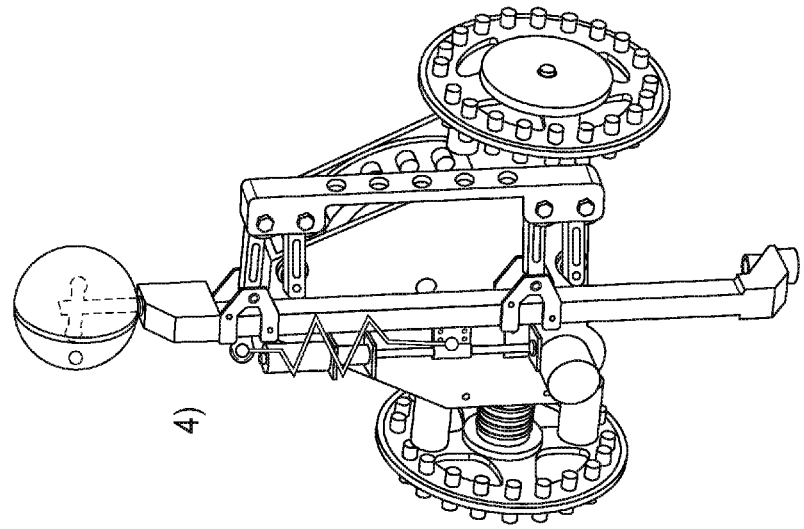
Figures 3, 11A:
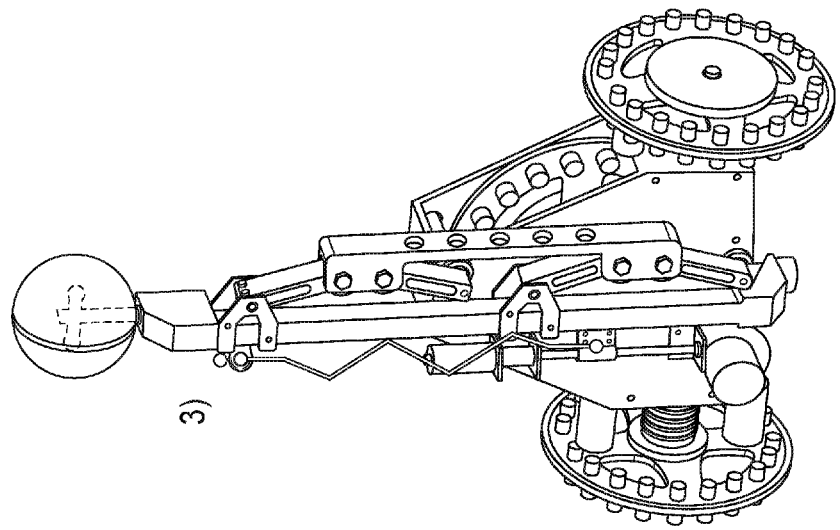

Referring now to FIGS. 11A-1 to 11A-4, a sequence of four states in a hopping motion for a 3-wheel robot based on designs in FIGS. 1 and 5A-5C is shown. 1) In the upright mode the hopping mechanism is locked in tension with the high-speed hopping motor off. Activation of the high-torque lead-screw drive motor produces a pretension in the elastomer springs. 2) When the springs are fully tensioned, the high-speed hopping motor is turned on to unlock hopping mechanism and release stored spring energy, 3-4) the high-speed hopping motor continues to operate until takeoff.

Figure 11B:
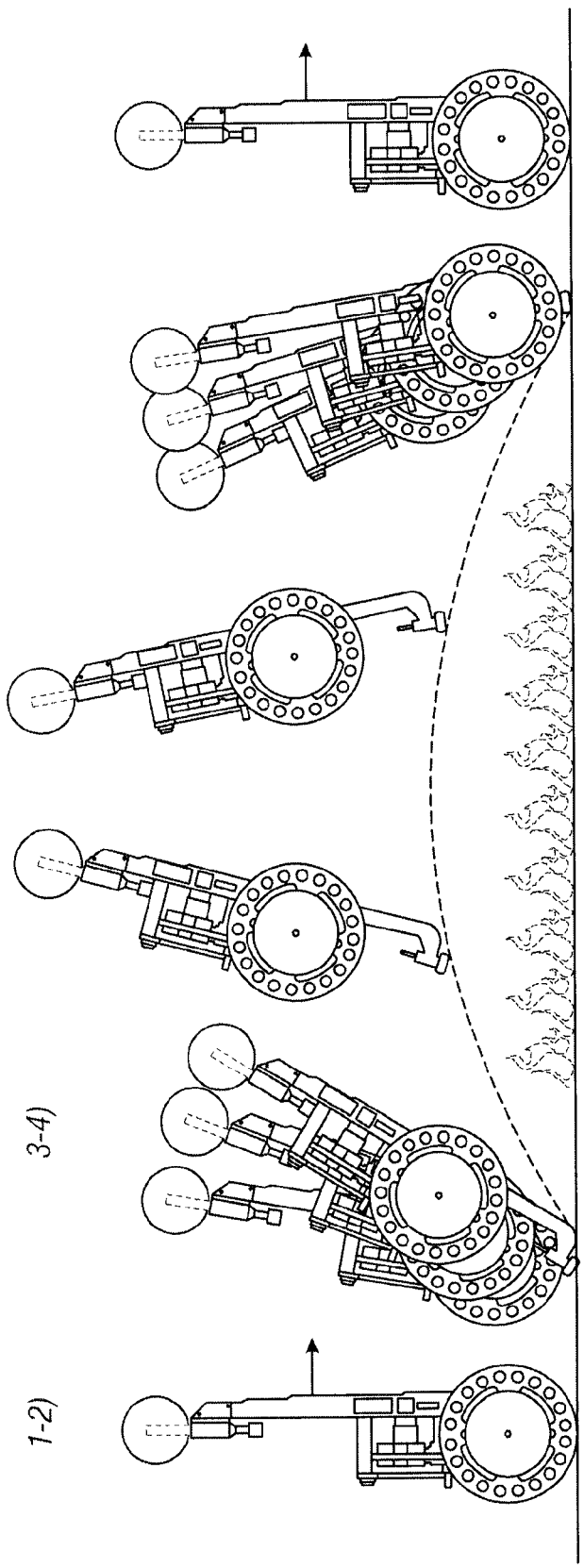

Continuous hopping in a pogo-stick-like manner is one mode of operation that may be realized with this design. FIG. 11B illustrates that the present hopping mechanism may also be locked, allowing the robot to collect energy into its spring-like mechanism gradually, then unlocked, allowing the robot to release this gradually-collected energy in the spring suddenly to achieve a single hop to a very high height. Upon return to earth, the spring may be re-tensioned as the leg is pushed into the body again and the vehicle caught in the "loaded-spring" state, prepared for another energetic jump. Such hopping on demand is, of course, much more energetically efficient than continuous hopping. If this hopping is initiated while the vehicle is in forward motion, then the vehicle will continue in forward motion when it is in the air. Thus, the combination of hopping and fast forward rolling motion may be used to clear complex obstacles (or holes in the ground) entirely.

Figure 12C:
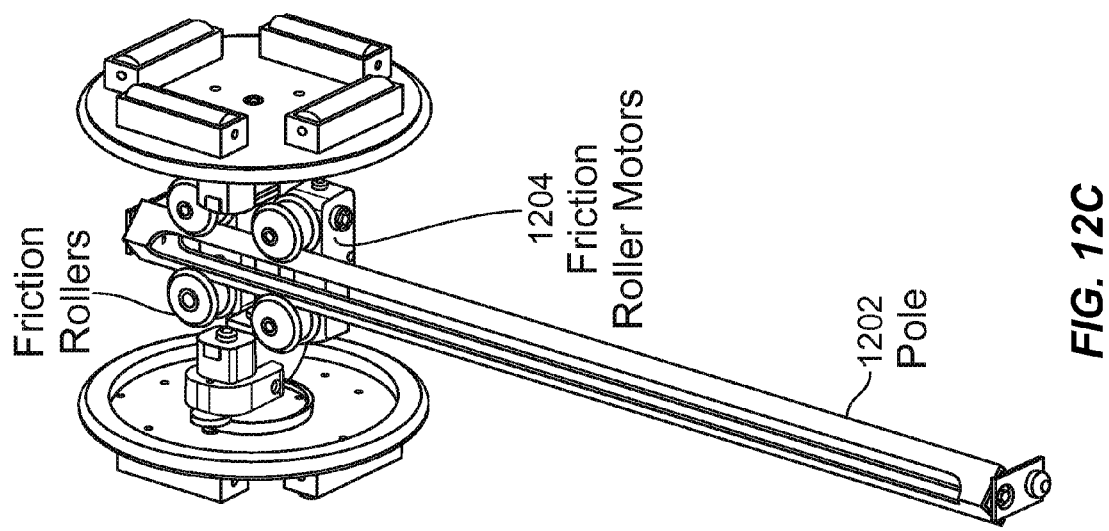

FIGS. 12A-12C illustrate an example of a motorized friction drive system facilitating pole climbing in a multimodal robot with two or more reaction drive wheels and respective reaction drive wheel motors (1203). This system includes a pole (1202) with a pre-selected length along which the two reaction drive wheels are movably engaged via motor-driven friction rollers (1201). In this example, two pairs of friction rollers (1201) are shown where the two friction rollers (1201) in each pair are located on two sides of the pole (1202) to engage to the pole (1202). The reaction wheel assembly with the two wheels is engaged to the friction rollers (1201) and move along the pole (1202) as the friction rollers (1201) rotate. Friction roller motors (1204) are provided to drive the friction rollers (1201), respectively. Three climbing positions are shown in FIGS. 12A-12C. This is a linear bearing with a motorized friction drive system and is designed to traverse the main body of the robot up and down the full length of the central pole or leg (1202).

Figure 13:
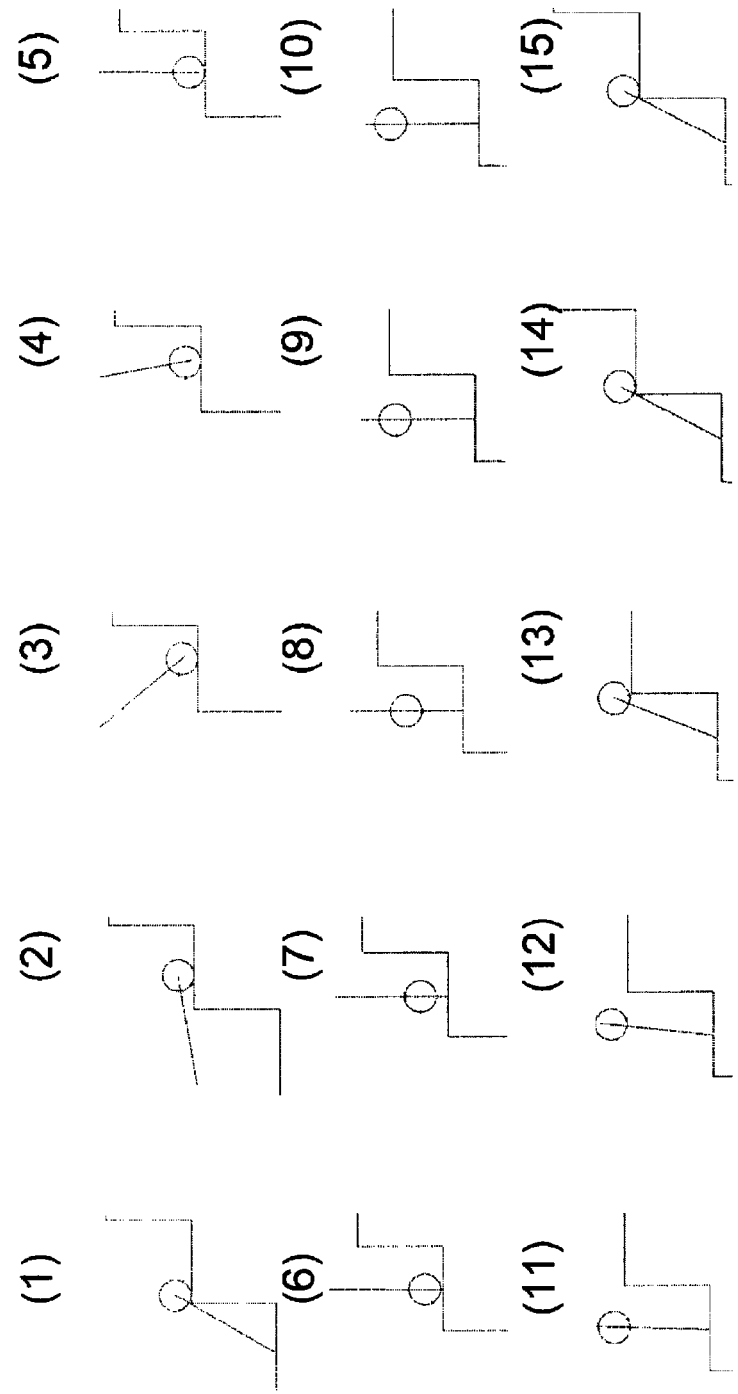
FIG. 13 illustrates pole-climbing operations of a multimodal robot in climbing stairs.

FIG. 13 shows an example of the climbing operation of the pole-climbing robotic system in FIGS. 12A-12C in climbing stairs. This example includes a sequence of 15 states of the robot. In essence, the robot is made to climb its own pole (balancing using its main wheels as inertial reaction wheels) until the robot reaches an adequate height, at which point the robot is made to lean onto the obstacle it is climbing. The robot then retracts its leg all the way through the body [or, alternatively, flips its body approximately 180 degrees] and then repeats the process to climb over the next obstacle or stair. This process is quasi-static, and may be performed backwards to climb down obstacles or stairs. In states (1)-(5), the robot uses its two drive wheels to rotate the pole to an upright position. Next, states (6)-(10) show that the robot climbs the pole when the pole is in the upright position. After reaching to the top of the pole in (11), the robot operates its reaction wheels to tilt towards the stair and to rest and lean against the stair as shown in state (13) so that the two drive wheels are on top of the next step. The above process repeats as the robot climbs the next step.

In the example in FIGS. 1-3, the two drive wheels are fixed in a parallel configuration. Alternatively, a configuration can be provided to allow the two wheels to adjust their relative orientations for various operations and motion maneuvers.

Figure 14A:
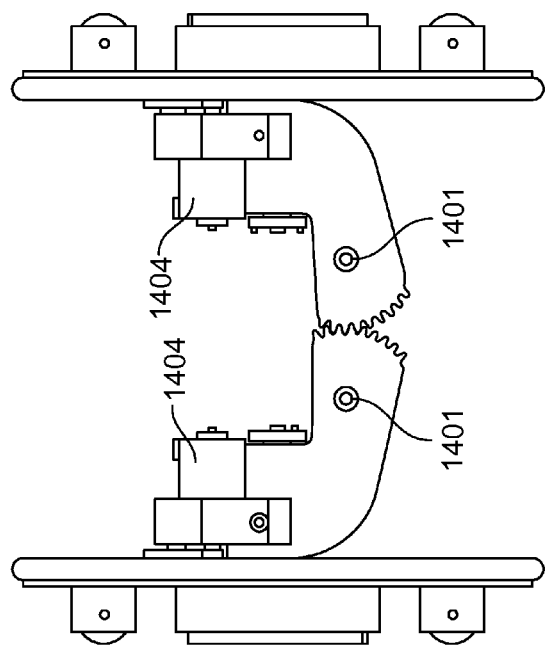
FIGS. 14A and 14B illustrate an example of a multimodal rover body design with two main reaction drive wheels that can change their relative orientations to be canted between a parallel configuration (FIG. 14A) and an approximately perpendicular configuration (FIG. 14B).
Figure 14B:
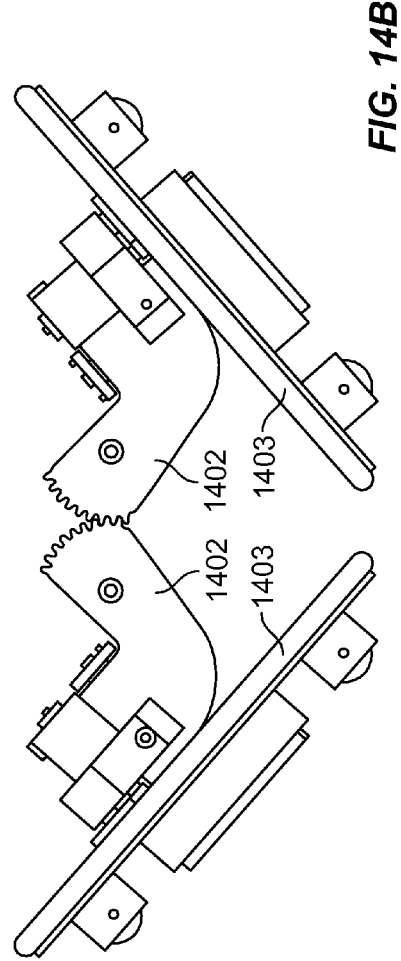

FIGS. 14A and 14B illustrate an example of a multimodal rover body design with two main reaction drive wheels that can change their relative orientations to be canted between a parallel configuration (FIG. 14A) and an approximately perpendicular configuration (FIG. 14B). This multimodal rover that hops and/or pole climbs may be constructed using only two main wheels (1403) instead of three, mounted at the ends of wheel support arms (1402) that engage to each other at geared joints (1401) and can counter-rotate or cant about the geared joints (1401). A motor can be used to control the relative motion of the two wheel support arms. When in contact with the ground, the axes of rotation of the wheels (1403) can be controlled to be approximately parallel as illustrated in FIG. 14A. When out of contact with the ground, the axes of rotation of the wheels (1403) in this embodiment are adjusted by counter-rotation about the geared joints (1401) to become approximately perpendicular to each other as illustrated in FIG. 14B.

Figures 15A, 15B:
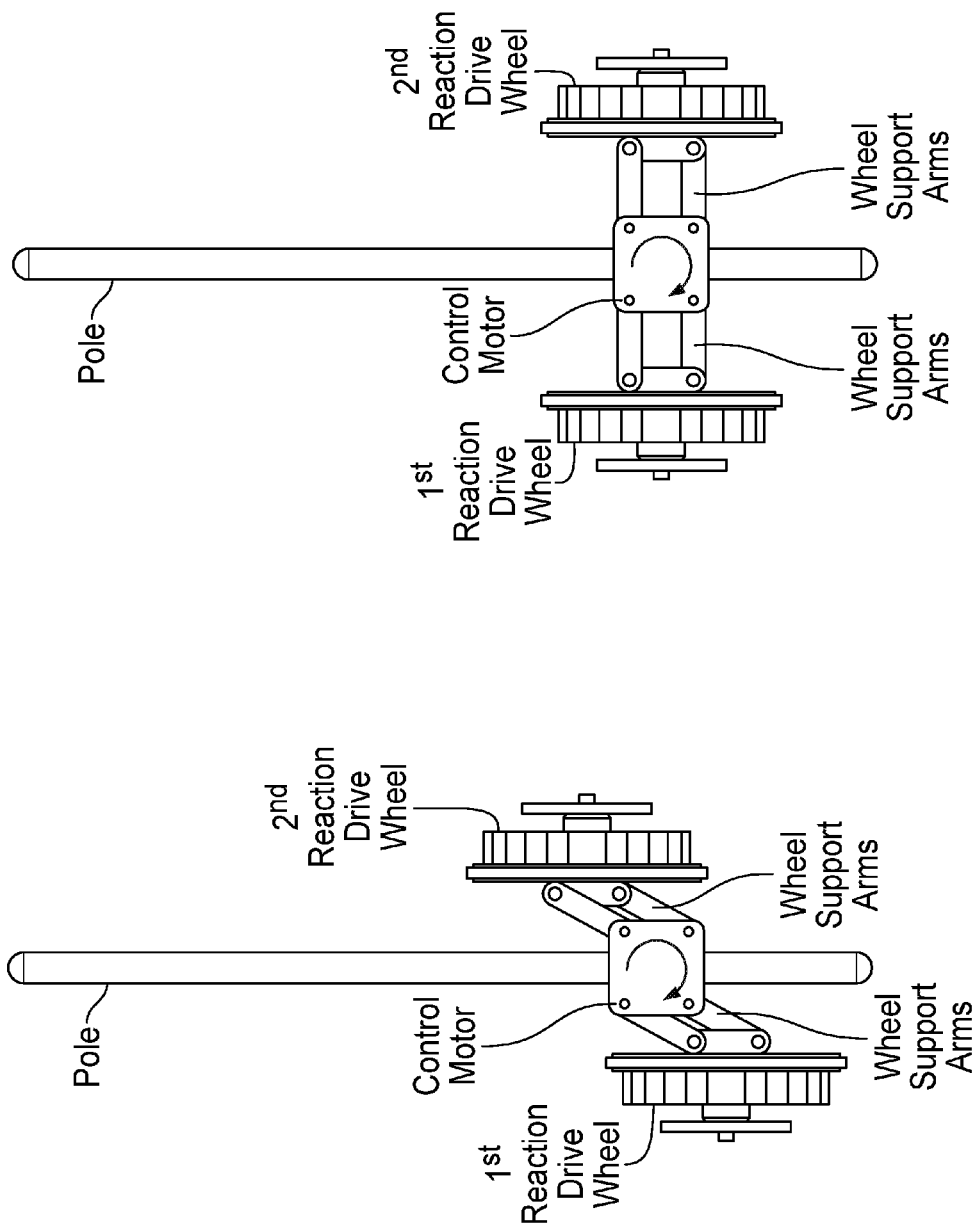
FIGS. 15A, 15B and 15C illustrate three different configurations of an exemplary multimodal rover body design with two reaction drive wheels that can shift in position about an axis perpendicular to the drive wheel axis of rotation.
Figure 15C:
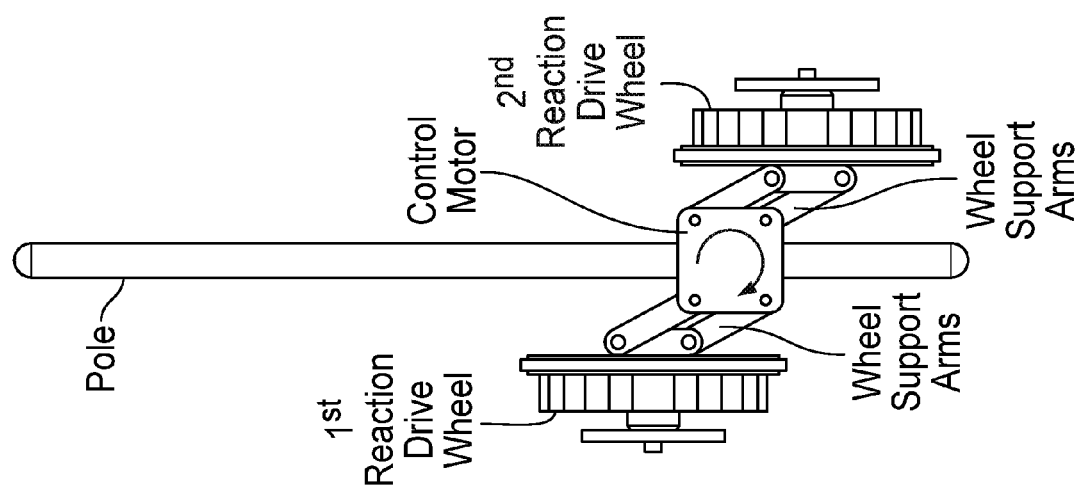

FIGS. 15A, 15B and 15C illustrate three different configurations of an exemplary multimodal rover body design with two reaction drive wheels that can shift in position about an axis perpendicular to the drive wheel axis of rotation. This robot hops and/or pole climbs using only two main wheels which in this case adjust primarily in their relative position instead of their relative orientation. The axes of rotation of the wheels are approximately parallel and coincident when in contact with the ground. When out of contact with the ground, the axes of rotation of the wheels in this embodiment remain parallel, however are translated about the roll axis, i.e. the axes perpendicular to the axes of rotation of the wheels, as marked by the arrow. This can be achieved b two rotating linkage wheel support arms and a control motor that rotates the two rotating linkage wheel support arms.

When the linkages rotate in the same direction at equal velocities, the center of mass remains fixed, and the rotating assembly emulates reaction wheel torque, which might otherwise require a separately powered wheel mounted orthogonal to the drive wheel axis of rotation. Additionally, when the linkages rotate out of synchronization, the center of mass may be shifted to appropriately counteract disturbances which might otherwise tip the vehicle over.

Hence, the independently-driven reaction drive wheels are used to propel and steer the robot system when in the horizontal roving and upright roving operational modes, and are used as reaction wheels to balance the robot system when in the pole climbing and hopping operational modes. The pole climbing mechanism and hopping mechanisms can be implemented when needed.

The coordination of multimodal robots can be achieved by using two distinct classes of control techniques. The first is known as nonlinear trajectory planning, and may be described as the offline computation of efficient control input sequences to command the robotic vehicle to perform the desired complex maneuvers efficiently (that is, with low control input energy), assuming one can derive a perfect physics-based model of the system with zero modeling errors (relating to motor efficiency, spring tension, coefficients of drag, etc.) and zero external disturbances (accounting for wind, surface irregularities, sensor noise, etc.). In one implementation, a control strategy for controlling such a multimodal robot can use a combination of nonlinear trajectory planning via gradient-based methods as well as time periodic linear quadratic Gaussian algorithms to reject disturbance from the approximately time-periodic hopping motion. The second is known as feedback control, and may be described as the online computation of additional (and, generally, small) control correction sequences to counter the unpredicted departures of the robotic vehicle from its desired trajectory in order to make it behave as desired even in the presence of both modeling errors and external disturbances. In the embodiments shown in the figures, the technique of adjoint-based model predictive control has been applied to the first problem and Linear Quadratic Gaussian feedback control has been applied to the second, to great effect. These techniques are described in great detail in the 2007 Masters theses of Sean Summers and David Szeto at the Department of Mechanical and Aerospace Engineering at the University of California, San Diego.

The features descried in this document can be used to construct a new class of multimodal agile robots that can self-transform between a plurality of horizontal roving, upright roving, pole climbing, and hopping modes. In one aspect, a multimodal robotic system can include a robot frame and two or more multifunctional wheels, that can self-transform between two or more of the following operational modes: horizontal roving: rolling on three or more wheels; upright roving: rolling on two approximately equal-sized wheels (referred to below as the "main wheels" of the robot system) situated approximately parallel to each other; pole climbing: balancing while self-climbing a pole that may be extended vertically downward from the main body; hopping: self-propelling into the air, either once or repeating many times, by energetically extending a pole vertically downward from the main body to launch the body into the air in a pogo-stick-like fashion. In one implementation, this robotic system can include a functional mass on its wheels which have significant mass in order to function as reaction wheels when the robot is in pole climbing and/or hopping modes. In one embodiment, the robot's batteries can be mounted on the wheels. In another embodiment, both the batteries and the drive motors can be mounted on the wheels; in this embodiment, a fixed spur gear or pulley may be mounted to the robot body concentric to the wheel axis, to which the shaft of one or more motor(s) mounted on the wheel may be engaged with a smaller gear or timing belt and pulley.

In another aspect, a robotic system with three reaction wheels can be designed so that the axes of the wheels are approximately fixed in their relative position and orientation. In this configuration, two of the wheels (the "main wheels") are arranged approximately parallel to each other (and are in contact with the ground when the device is in the upright roving configuration). The axis of the third reaction wheel is approximately perpendicular to the axis of the main wheels and is also approximately perpendicular to vertical when the robot is in upright roving configuration.

In another aspect, a robotic system with two reaction wheels can be designed to allow the axes to be adjustable primarily in their relative orientation. In this configuration, the wheels are arranged approximately parallel to each other (and are in contact with the ground) when the device is in both the horizontal roving configuration and the upright roving configuration. When the robot body and the attached wheels leave the ground (when the robot is pole climbing or hopping), these two wheels are adjusted to be at an angle to each other in order to facilitate reaction-wheel stabilization of the robot around both the pitch axis and the roll axis. For example, in one embodiment of this configuration, the wheels can be adjusted to be at a 90 degree angle to each other when the robot is in the pole climbing and/or hopping modes. The wheels can be arranged approximately parallel to each other at all times, and are in contact with the ground when the device is in both the horizontal roving configuration and the upright roving configuration. When the robot body and the attached wheels leave the ground (when the robot is pole climbing and/or hopping), these two wheels are torqued in order to facilitate reaction-wheel stabilization of the robot around the pitch axis, while they are also moved left and right (for example, via mounting either on the ends of two swing-arms or on the ends of a single long axis approximately perpendicular to the main axis of the body) in order to facilitate stabilization of the robot around the roll axis by mass movement, akin to a tightrope walker maintaining balance by moving a pole left and right.

In a robotic system, a slowly extensible and retractable pole can be provided to extend vertically downward from the main body of the robot, thereby capable of lifting the main body of the robot into the air. In this configuration, the reaction wheels of the robot may be used to balance the vehicle.

A robotic system can also be designed with an energetically extensible and retractable pole that may be quickly extended vertically downward from the main body of the robot, thereby capable of launching the entire robot (that is, the body and the leg) into the air in a pogo-stick like fashion. In this configuration, the reaction wheels of the robot may be used to balance the vehicle.

In another aspect, a hybrid optical/visual range sensor mounted on the robot system may be combined with Artificial Intelligence incorporated in the controlling electronics to attain situational awareness and thereby aid in predictive path planning in complex environments.

Furthermore, a robotic system may be used to mount complex or steep obstacles (stairs, rugged terrain, etc.) via a sequence of i) pole climbing, ii) leaning, iii) rolling, and iv) self-uprighting onto successively higher positions on the obstacle, akin, loosely speaking, to an uphill "inverse-slinky" maneuver. This maneuver, which is quasi-static, can also be applied backwards in order to climb down a complex or steep obstacle in a controlled fashion. The robotic system described can be used to overcome complex obstacles (or voids) via a "running jump" maneuver. This maneuver may be achieved by executing an energetic single hop while undergoing rapid forward motion, resulting in a parabolic trajectory of the robot over the obstacle of interest.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The invention claimed is:

1. A robot, comprising:
 a robot frame;
 an elongated rigid beam movably engaged to the robot frame as a hopping leg;
 two pitch-axis reaction drive wheels engaged to the robot frame, mounted on opposite sides of the robot frame, to spin around a pitch axis and provide reaction-wheel stabilization when the pitch-axis reaction drive wheels are not in contact with one or more surfaces, or to drive and steer the robot when these wheels are in contact with one or more surfaces, wherein the pitch-axis reaction drive wheels are independently powered, controlled and operated;
 a roll-axis reaction drive wheel engaged to the robot frame to spin around a rotation axis that is perpendicular to the pitch axis, and operable to balance the robot when the pitch axis wheel is not in contact with a surface; and
 a hopping propulsion mechanism comprising coupled linkages tensioned by one or more springs and actuated in a rotary manner, thereby acting as continuously variable transmission between rotation of a motor output shaft and linear motion of the hopping leg.

2. The robot as in claim 1, wherein each of the first and second pitch-axis reaction drive wheels and the roll-axis reaction drive wheel is configured to comprise a drive motor and a portable power supply that energizes the drive motor to power the respective wheel.

3. The robot as in claim 2, wherein the portable power supply comprises at least one battery, and in which these batteries function together with the wheel-mounted motors as ballast to increase the reaction wheel inertia.

4. The robot as in claim 1, wherein the hopping propulsion mechanism comprises one or more coupled four bar linkage mechanisms to produce the linear motion of the hopping leg along a straight line.

5. The robot as in claim 1, wherein the hopping propulsion mechanism comprises one or more coupled four bar linkage mechanisms to lock the one or more springs into a fully tensioned state.

6. The robot as in claim 1, comprising a body-mounted motion sensing module to detect the motion and orientation of the robot, consisting of one or more of the following: a magnetometer, a gyroscope, an accelerometer, and/or a GPS unit.

7. The robot as in claim 1, comprising an integrated vision system to detect and identify surroundings and/or objects of interest.

8. A method of operating the robot as in claim 1, comprising:
 independently controlling the rotation of first and second pitch-axis reaction drive wheels to propel and steer the robot as a rover, either in a horizontal configuration when the robot is supported by first and second pitch-axis reaction drive wheels and the roll-axis reaction wheel or an upright configuration when the robot is supported by first and second pitch-axis reaction drive wheels, and further, using the torque of the first and second pitch-axis reaction drive wheels to transition between the horizontal and upright configurations.

9. The method as in claim 8, further comprising controlling the rotation of the first and second pitch-axis and roll-axis reaction wheels to stabilize the robot about both axes when the pitch axis wheels are not in contact with the ground.

10. The method as in claim 8, further comprising:
 activating the hopping propulsion mechanism to cause the robot to hop.

11. The method as in claim 8, further comprising controlling the robot based on a nonlinear trajectory planning to counter external disturbances to the robot.

12. The robot as in claim 1, wherein each reaction drive wheel comprises:
 a drive motor that is engaged at a location off a respective rotation axis of the reaction wheel as a functional mass and drives the reactive wheel to rotate around the respective rotation axis; and
 a portable power supply that is engaged at a location off the respective rotation axis of the reaction wheel as a functional mass and energizes the drive motor to drive the reaction drive wheel.

13. The robot as in claim 1, wherein each reaction drive wheel comprises:
 a drive motor that is engaged at a location off a respective rotation axis of the reaction wheel as a functional mass and drives the reactive wheel to rotate around the respective rotation axis; and
 a plurality of portable power supplies that are engaged at locations off the respective rotation axis of the reaction wheel as a functional mass and energize the drive motor to drive the reaction drive wheel.

14. The robot as in claim 1, wherein:
 the two pitch-axis reaction drive wheels are structured to have sufficient inertial in each wheel to drive the robot to control a direction of the hopping leg with respect to the pitch axis to include at least (1) a first direction in which the hopping leg is directed upward from a surface on which the two pitch-axis reaction drive wheels are located and on which the robot roves or hops, and (2) a second direction in which the hopping leg is pointed along a surface on which the two pitch-axis reaction drive wheels are located and on which the robot roves.

15. The robot as in claim 1, wherein:
the two pitch-axis reaction drive wheels are mounted to the robot frame to be adjustable in their orientations relative to each other to include at least (1) a first relative orientation in which the two pitch-axis reaction drive wheels are parallel and each spins around the pitch axis, and (2) a second relative orientation in which the two pitch-axis reaction drive wheels are oriented at a relative angle with respect to each other and each spins around a respective rotation axis that deviates from the pitch axis by the relative angle.

16. The robot as in claim 15, comprising:
a control mechanism to control the two pitch-axis reaction drive wheels in the first relative orientation in roving on a surface.

17. The robot as in claim 15, comprising:
a control mechanism to control the two pitch-axis reaction drive wheels in the second relative orientation to balance the robot when the hopping propulsion mechanism drives the robot to hop above a surface.

18. The robot as in claim 1, wherein:
the hopping propulsion mechanism comprises a propulsion motor that drives the coupled linkages to cause the hopping leg to move relative to the robot frame to cause the robot to hop.

19. The robot as in claim 18, wherein:
the propulsion motor includes a motor housing relative to which the motor output shaft rotates, and
the hopping propulsion mechanism comprises a motor engagement mechanism to engage the propulsion motor in a first motor mode in which the motor output shaft is fixed while the motor housing rotates around the motor output shaft and a second motor mode in which the motor housing is fixed while the motor output shaft rotates, and
one of the first and second motor modes is used to stretch the springs and the other motor mode is used to actuate the coupled linkages in controlling hopping of the robot.

20. A robot, comprising:
a robot frame;
an elongated rigid beam movably engaged to the robot frame as a hopping leg;
first and second pitch-axis reaction drive wheels engaged to the robot frame on two opposite sides to spin around a first rotation axis, wherein the first and second pitch-axis reaction drive wheels are positioned to stabilize the robot and to drive and move the robot, and wherein the first and second pitch-axis reaction drive wheels are independently powered, controlled and operated;
a roll-axis reaction drive wheel engaged to the robot frame to spin around a second rotation axis that is perpendicular to the first rotation axis around which the first and second pitch-axis reaction drive wheels spin and operable to balance the robot; and
a spring-loaded hopping propulsion device mounted to the hopping leg and the robot frame to comprise a linkage structure that engages the hopping leg to the robot frame and a hopping propulsion motor that causes a motion of the hopping leg relative to the robot frame.

21. The robot as in claim 20, wherein each of the first and second pitch-axis reaction drive wheels and the roll-axis reaction drive wheel is configured to comprise a drive motor and a portable power supply that energizes the drive motor to power the respective wheel.

22. The robot as in claim 21, wherein the portable power supply comprises at least one battery.

23. The robot as in claim 21, wherein the linkage structure of the spring-loaded hopping propulsion device comprises four linked bars.

24. The robot as in claim 21, further comprising:
a motion sensing module mounted to the robot frame and operable to detect a motion and orientation of the robot.

25. The robot as in claim 24, wherein the motion sensing module comprises at least one accelerometer and one gyroscope.

26. The robot as in claim 25, wherein the motion sensing module comprises:
three accelerometers for measurements along three orthogonal directions; and
three gyroscopes for measurements along three orthogonal directions.

27. The robot as in claim 20, wherein:
the hopping propulsion motor comprises a rotary output shaft and a motor housing relative to which the rotary output shaft rotates,
the hopping propulsion device comprises a spring engaged to the linkage structure that connects the robot frame and the hopping leg to each other to cause a relative linear motion between the robot frame and the hopping leg to cause the robot to hop, the spring being engaged to the rotary output shaft to change spring tension when the rotary output shaft rotates relative to the motor housing fixed relative to the robot frame and the motor housing being engaged to the linkage structure to move the hopping leg relative to the robot frame when the rotary output shaft is fixed relative to the robot frame while the motor housing rotates relative to the robot frame; and
the robot comprises a first motor engagement mechanism to fix the rotary output shaft relative to the robot frame and to allow the motor housing to rotate relative to the robot frame, a second motor engagement mechanism to fix the motor housing relative to the robot frame and to allow the rotary output shaft to rotate relative to the robot frame, and a control mechanism to activate one of the first and second motor engagement mechanisms at one time while disabling the other.

28. A robot, comprising:
a first reaction drive wheel comprising a first rotation axis around which the first reaction drive wheel spins, a first wheel motor to cause the first reaction drive wheel to spin, and a first power supply that energizes the first wheel motor;
a second reaction drive wheel comprising a second rotation axis around which the second reaction drive wheel spins, a second wheel motor to cause the second reaction drive wheel to spin, and a second power supply that energizes the second wheel motor;
a pole;
a wheel mount movably engaged to the pole and engaged to the first and second reaction drive wheels on two sides of the pole, the wheel mount comprising a motorized unit to drive the wheel mount along the pole; and
an adjustable wheel holding unit engaged to the first and second reaction drive wheels and located between the first and second reaction drive wheels to control and adjust a relative orientation between the first and second reaction drive wheels to include at least (1) a first relative orientation in which the first and second reaction drive wheels are parallel, and (2) a second relative orientation in which the first and second reaction drive wheels are oriented at a relative angle with respect to each other.

29. A robot, comprising:
a first reaction drive wheel comprising a first rotation axis around which the first reaction drive wheel spins, a first wheel motor to cause the first reaction drive wheel to spin, and a first power supply that energizes the first wheel motor;
a second reaction drive wheel comprising a second rotation axis around which the second reaction drive wheel spins, a second wheel motor to cause the second reaction drive wheel to spin, and a second power supply that energizes the second wheel motor;
a pole;
a wheel mount movably engaged to the pole and engaged to the first and second reaction drive wheels on two sides of the pole, the wheel mount comprising a motorized unit to drive the wheel mount along the pole;
a first wheel support arm having a first end engaged to the first reaction drive wheel and a second end engaged to the wheel mount, the first wheel support arm movable around the wheel mount to change a position of the first reaction drive wheel relative to the wheel mount; and
a second wheel support arm having a first end engaged to the second reaction drive wheel and a second end engaged to the wheel mount, the second wheel support arm movable around the wheel mount to change a position of the second reaction drive wheel relative to the wheel mount.

30. The robot as in claim 29, wherein:
the first and second wheel support arms are located symmetric to each other with respect to the wheel mount and are on opposite sides of the pole as the first and second wheel support arms move around the wheel mount.

31. A robot, comprising:
a first reaction drive wheel comprising a first rotation axis around which the first reaction drive wheel spins, a first wheel motor to cause the first reaction drive wheel to spin, and a first power supply that energizes the first wheel motor;
a second reaction drive wheel comprising a second rotation axis around which the second reaction drive wheel spins, a second wheel motor to cause the second first reaction drive wheel to spin, and a second power supply that energizes the second wheel motor;
a pole; and
a wheel mount movably engaged to the pole and engaged to the first and second reaction drive wheels on two sides of the pole, the wheel mount comprising a motorized unit to drive the wheel mount along the pole,
the wheel mount comprises:
    a plurality of pair of friction rollers, each pair being movably engaged to the pole to move along the pole by friction; and
    a plurality of friction roller motors, each friction roller motor engaged to drive a respective friction roller.

32. A robot, comprising:
a robot frame;
an elongated rigid beam movably engaged to the robot frame as a hopping leg;
a first reaction drive wheel engaged to the robot frame on a first side of the hopping leg and comprising a first rotation axis around which the first reaction drive wheel spins, a first wheel motor to cause the first reaction drive wheel to spin, and a first power supply that energizes the first wheel motor;
a second reaction drive wheel engaged to the robot frame on a second side of the hopping leg and comprising a second rotation axis around which the second reaction drive wheel spins, a second wheel motor to cause the second reaction drive wheel to spin, and a second power supply that energizes the second wheel motor; and
a hopping propulsion device mounted to the hopping leg and the robot frame and structured to include a linkage structure that engages the hopping leg to the robot frame and a hopping propulsion motor that causes a motion of linkage structure to move the hopping leg relative to the robot frame to cause the robot to hop.

33. The robot as in claim 32, wherein:
the hopping propulsion motor comprises a rotary output shaft and a motor housing relative to which the rotary output shaft rotates,
the hopping propulsion device comprises a spring engaged to the linkage structure that connects the robot frame and the hopping leg to each other to cause a relative linear motion between the robot frame and the hopping leg to cause the robot to hop, the spring being engaged to the rotary output shaft to change spring tension when the rotary output shaft rotates relative to the motor housing fixed relative to the robot frame and the motor housing being engaged to the linkage structure to move the hopping leg relative to the robot frame when the rotary output shaft is fixed relative to the robot frame while the motor housing rotates relative to the robot frame; and
the robot comprises a first motor engagement mechanism to fix the rotary output shaft relative to the robot frame and to allow the motor housing to rotate relative to the robot frame, a second motor engagement mechanism to fix the motor housing relative to the robot frame and to allow the rotary output shaft to rotate relative to the robot frame, and a control mechanism to activate one of the first and second motor engagement mechanisms at one time while disabling the other.

34. The robot as in claim 32, wherein:
the first and second reaction drive wheels are structured to have sufficient inertial to drive the robot to control a direction of the hopping leg to include at least (1) a first direction in which the hopping leg is directed upward from a surface on which the first and second reaction drive wheels are located and on which the robot roves or hops, and (2) a second direction in which the hopping leg is pointed along a surface on which the first and second reaction drive wheels are located and on which the robot roves.

35. The robot as in claim 32, wherein:
the first and second reaction drive wheels are mounted to the robot frame to be adjustable in their orientations relative to each other to include at least (1) a first relative orientation in which the first and second reaction drive wheels are parallel, and (2) a second relative orientation in which the first and second reaction drive wheels are oriented at a relative angle with respect to each other.

36. The robot as in claim 35, comprising:
a control mechanism to control the first and second reaction drive wheels in the first relative orientation in roving on a surface.

37. The robot as in claim 35, comprising:
a control mechanism to control the first and second reaction drive wheels in the second relative orientation to balance the robot when the robot hops above a surface.

* * * * *